United States Patent
Sakamoto et al.

(10) Patent No.: US 10,083,545 B2
(45) Date of Patent: Sep. 25, 2018

(54) IMAGE PROCESSING DEVICE, IMAGE PROCESSING METHOD, AND NON-TRANSITORY COMPUTER-READABLE RECORDING MEDIUM FOR SPECIFYING MARKERS IN ACCEPTED IMAGE DATA

(71) Applicant: YAHOO JAPAN CORPORATION, Tokyo (JP)

(72) Inventors: Ryuki Sakamoto, Tokyo (JP); Shinichi Higashino, Tokyo (JP); Sakiko Nishi, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 54 days.

(21) Appl. No.: 15/445,149

(22) Filed: Feb. 28, 2017

(65) Prior Publication Data
US 2017/0365099 A1    Dec. 21, 2017

(30) Foreign Application Priority Data
Jun. 20, 2016 (JP) ................. 2016-121734

(51) Int. Cl.
*G06T 19/00* (2011.01)
*G06T 7/62* (2017.01)
(Continued)

(52) U.S. Cl.
CPC .......... *G06T 19/006* (2013.01); *G06K 9/6215* (2013.01); *G06T 3/20* (2013.01);
(Continued)

(58) Field of Classification Search
CPC .......... G06T 19/006; G06T 7/30; G06T 3/20; G06T 7/62; G06T 7/74; G06T 2207/30204; G06K 9/6215
See application file for complete search history.

(56) References Cited

U.S. PATENT DOCUMENTS

| | | | | |
|---|---|---|---|---|
| 2009/0188413 A1* | 7/2009 | Hirata | ............... | D05B 19/10 112/103 |
| 2014/0036097 A1* | 2/2014 | Sexton | ............... | H04N 5/23206 348/207.1 |

(Continued)

FOREIGN PATENT DOCUMENTS

| JP | S61-184692 A | 8/1986 |
|---|---|---|
| JP | H09-501234 A | 2/1997 |

(Continued)

OTHER PUBLICATIONS

Oct. 6, 2016 Office Action issued in Japanese Patent Application No. 2016-121734.

*Primary Examiner* — Maurice L. McDowell, Jr.
(74) *Attorney, Agent, or Firm* — Oliff PLC

(57) ABSTRACT

An image processing device according to the present application includes an accepting unit and a specifying unit. The accepting unit accepts image data that includes therein at least two diagrams that can be extracted as circles. The specifying unit specifies, by checking a parameter that is calculated from a pair of two circles included in the image data accepted by the accepting unit against a parameter that is calculated from a pair of two perfect circles that have previously been registered as markers that are used for image processing, the pair of the two circles included in the image data as the markers.

13 Claims, 10 Drawing Sheets

(51) Int. Cl.
  *G06T 7/73* (2017.01)
  *G06T 7/30* (2017.01)
  *G06K 9/62* (2006.01)
  *G06T 3/20* (2006.01)

(52) U.S. Cl.
  CPC .............. *G06T 7/30* (2017.01); *G06T 7/62* (2017.01); *G06T 7/74* (2017.01); *G06T 2207/30204* (2013.01)

(56) References Cited

U.S. PATENT DOCUMENTS

| | | | |
|---|---|---|---|
| 2015/0128878 A1* | 5/2015 | Van Curen | G06K 9/00671 119/721 |
| 2016/0253794 A1* | 9/2016 | Shekar | G06T 7/194 382/141 |
| 2016/0371559 A1* | 12/2016 | Yang | G06K 9/4604 |

FOREIGN PATENT DOCUMENTS

| | | |
|---|---|---|
| JP | 2007-286715 A | 11/2007 |
| JP | 2010-081587 A | 4/2010 |
| JP | 2011-019707 A | 2/2011 |
| JP | 2014-225753 A | 12/2014 |
| JP | 2014-239384 A | 12/2014 |
| JP | 2015-127903 A | 7/2015 |
| JP | 2016-071705 A | 5/2016 |

\* cited by examiner

IMAGE PROCESSING DEVICE, IMAGE PROCESSING METHOD, AND NON-TRANSITORY COMPUTER-READABLE RECORDING MEDIUM FOR SPECIFYING MARKERS IN ACCEPTED IMAGE DATA

CROSS-REFERENCE TO RELATED APPLICATION(S)

The present application claims priority to and incorporates by reference the entire contents of Japanese Patent Application No. 2016-121734 filed in Japan on Jun. 20, 2016.

BACKGROUND OF THE INVENTION

1. Field of the Invention

The present invention relates to an image processing device, an image processing method, and a non-transitory computer readable recording medium having stored therein an image processing program.

2. Description of the Related Art

As a technology related to augmented reality (AR), there is a known technology that specifies the positions of markers in image data in which predetermined markers are captured and that displays as an image in which virtual substances are superimposed on the positions of the subject markers.

For example, there is a known technology that recognizes a subject by capturing the subject on a sheet in which a marker that is a feature point is printed (for example, Japanese Laid-open Patent Publication No. 2007-286715). The document according to the conventional technology discloses a technique that records feature point display medium information that is information related to a marker itself in the marker and that specifies the information by image recognition, thereby freely changing the condition in which the marker can be used. Furthermore, as image processing with respect to a common subject in a plurality of pieces of image data, for example, a technology related to a process of creating a free viewpoint image has been disclosed (for example, Japanese Laid-open Patent Publication No. 2014-239384 and Japanese Laid-open Patent Publication No. 2015-127903). Furthermore, in the document according to the conventional technology, a technology related to image projective transformation is also disclosed.

However, in the conventional technology described above (for example, Japanese Laid-open Patent Publication No. 2007-286715), it is difficult to use, in the image processing, image data that includes therein markers without causing any sense of discomfort. For example, in the conventional technology according to Japanese Laid-open Patent Publication No. 2007-286715, there is a need to use a marker to which the identifier or feature information is attached. However, regarding the marker to which the identifier or the feature information is attached, because information is described in the marker itself, an external appearance is not sometimes fit for a living scene. Namely, markers in the conventional technology may sometimes be unnaturally distinguished in the image data. Consequently, in the conventional technology, it is difficult to include markers in the form of fitting for the image data and perform appropriate image processing by recognizing the markers.

SUMMARY OF THE INVENTION

It is an object of the present invention to at least partially solve the problems in the conventional technology.

An image processing device according to the present application includes an accepting unit that accepts image data that includes therein at least two diagrams that can be extracted as circles, and a specifying unit that specifies, by checking a parameter that is calculated from a pair of two circles included in the image data accepted by the accepting unit against a parameter that is calculated from a pair of two perfect circles that have previously been registered as markers that are used for image processing, the pair of the two circles included in the image data as the markers.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
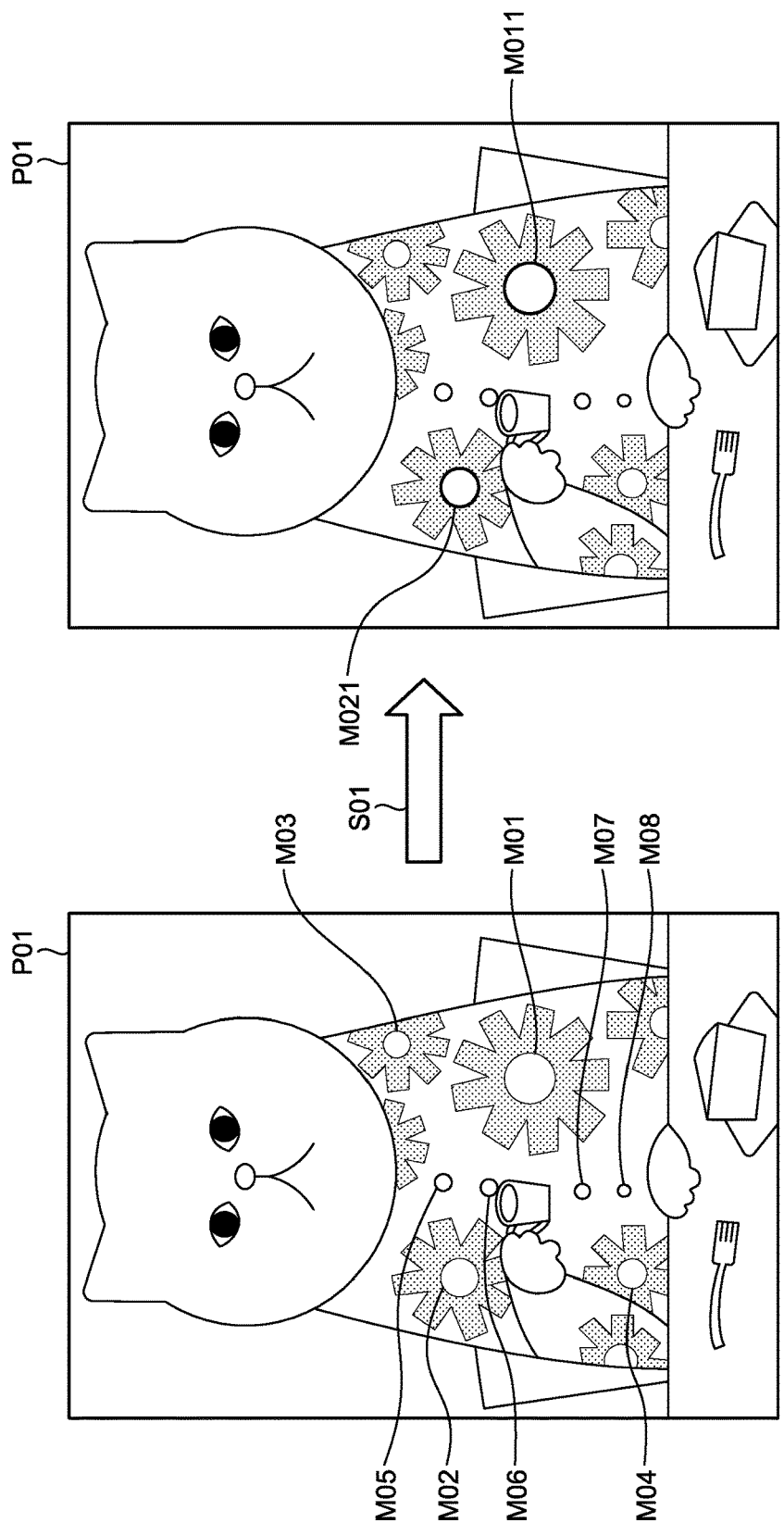
FIG. 1 is a schematic diagram (1) illustrating an example of image data according to an embodiment.

Preferred embodiments of an image processing device, an image processing method, and a non-transitory computer readable recording medium having stored therein an image processing program disclosed in the present invention will be described in detail below with reference to the accompanying drawings. Furthermore, the image processing device, the image processing method, and the non-transitory computer readable recording medium having stored therein the image processing program according to the present invention are not limited to the embodiments. Furthermore, in the embodiments below, the same components are denoted by the same reference numerals and an overlapping description will be omitted.

1. Example of Image Processing

An image processing device 100 (see FIG. 5) according to the embodiment acquires image data and detects a feature point included in the acquired image data as a marker.

Furthermore, the image processing device 100 performs image processing related to augmented reality (AR), such as displaying a predetermined object by superimposing the object at the position of the detected marker, displaying service information or the like, which has been attached to the subject marker, on the image data, and providing the information to a user, or the like.

Specifically, the image processing device 100 previously registers the diagrams that are used as markers from among predetermined diagrams included in the image data. Then, the image processing device 100 accepts, from a user who uses, for example, the image processing device 100, the image data that includes therein diagrams that are detected as the markers. The image processing device 100 detects the markers from the accepted image data. Then, the image processing device 100 shapes the image data on the basis of the shaping information (for example, an object to be superimposed on a target marker, or information attached to the target marker) that is previously set in the target marker. As an example, the image processing device 100 shapes the accepted image data to new image data in which a new object is superimposed on the position of the marker. Then, the image processing device 100 sends back the shaped image data to the user. Namely, the user sends the image data that includes therein diagrams detected as markers to the image processing device 100, whereby the user can acquire the image data in which a new object is shaped at a position that is detected as the marker. Furthermore, for example, the user captures the diagrams that are detected as the markers by a camera or the like, whereby the user can acquire the image data that serves as the shaping source.

Here, as the diagram (feature point) that is detected as a marker in the image data, instead of using the feature point to which an identifier or feature information on, for example, the QR code (registered trademark) is attached, the image processing device 100 uses a natural feature point included in the image data as a marker. As an example, the image processing device 100 uses two circular diagrams included in the image data as the markers for an AR process. Specifically, the image processing device 100 uses, as the feature points for detecting the markers, both the positional relationship between the two circles included in the image data and the ratio of the diameter of one of the two circles to the diameter of a predetermined reference. Consequently, instead of a singular diagram that is clearly recognized as a marker, such as the QR code, the image processing device 100 uses, as a marker, the feature point (in the embodiment, the two circles) that is matched with the image without causing any discomfort for a user.

The image processing performed by the image processing device 100 according to the embodiment will be described with reference to drawings.

First, an example of the image data used by the image processing device 100 and the an example of the image processing performed by the image processing device 100 will be described with reference to FIGS. 1 to 4. In FIG. 1, the image data used by the image processing device 100 will be described. FIG. 1 is a schematic diagram (1) illustrating an example of image data according to an embodiment.

As illustrated in FIG. 1, the image processing device 100 uses, for a process, image data P01 on an image in which a plurality of circles is included. For example, when the image processing device 100 acquires the image data P01, the image processing device 100 detects circles M01 to M08 that are included in the image data P01. Furthermore, it is assumed that the circles that are included in the image data P01 and that are used for the image processing according to the embodiment are perfect circles in each of which the diameter and the radius are substantially the same. Namely, the image processing device 100 acquires, as the image that is used for the process, image data that includes therein at least two perfect circles.

In the example illustrated in FIG. 1, the image processing device 100 detects, from the image data P01, the eight perfect circles, i.e., the circles M01 to M08. Here, the image processing device 100 accepts an assignment of a combination (pair) of the two circles that are used as the markers. For example, the image processing device 100 accepts the assignment of the pair in accordance with an input performed by an administrator who manages the image processing device 100. In the example illustrated in FIG. 1, the image processing device 100 accepts the assignment of the circle M01 and the circle M02 from among the circles M01 to M08 to the pair that is used as the markers (Step S01). Furthermore, instead of accepting the assignment of the pair in a human-induced manner, the image processing device 100 may also automatically assign the pair.

Furthermore, the image processing device 100 accepts the assignment of a reference circle and a variation circle with respect to the assigned pair. In the embodiment, the reference circle is a circle that serves as a reference and that is used to specify a variation circle. Furthermore, the variation circle is the circle in which, when the variation circle is detected as a marker, the ratio of the diameter with respect to a predetermined reference. Namely, the markers constituted by the pair of two circles can be detected as different markers by changing the ratio of the diameter of the variation circle. For example, the pair in which the ratio of the diameter of the variation circle with respect to the predetermined reference is "1" and the pair in which the ratio of the diameter of the variation circle with respect to the predetermined reference is "1.05" are detected as different markers. Furthermore, any numeric value may also be used for the predetermined reference as long as the ratio of the diameter of the variation circle can be obtained from the numeric value. An example of the predetermined reference according to the embodiment is the length of the diameter of the reference circle.

In the example illustrated in FIG. 1, it is assumed that the image processing device 100 has accepted the assignment of the circle M01 as the variation circle M011 and the assignment of the circle M02 as the reference circle M021. In this case, the image processing device 100 registers, as feature information that is used to detect circles as markers, both the positional relationship between the reference circle M021 and the variation circle M011 and the ratio of the diameter of the variation circle M011. Furthermore, a detecting process of the positional relationship between the reference circle M021 and the variation circle M011 and a calculation process of the ratio of the diameter of the variation circle M011 will be described in detail later.

Figure 2:
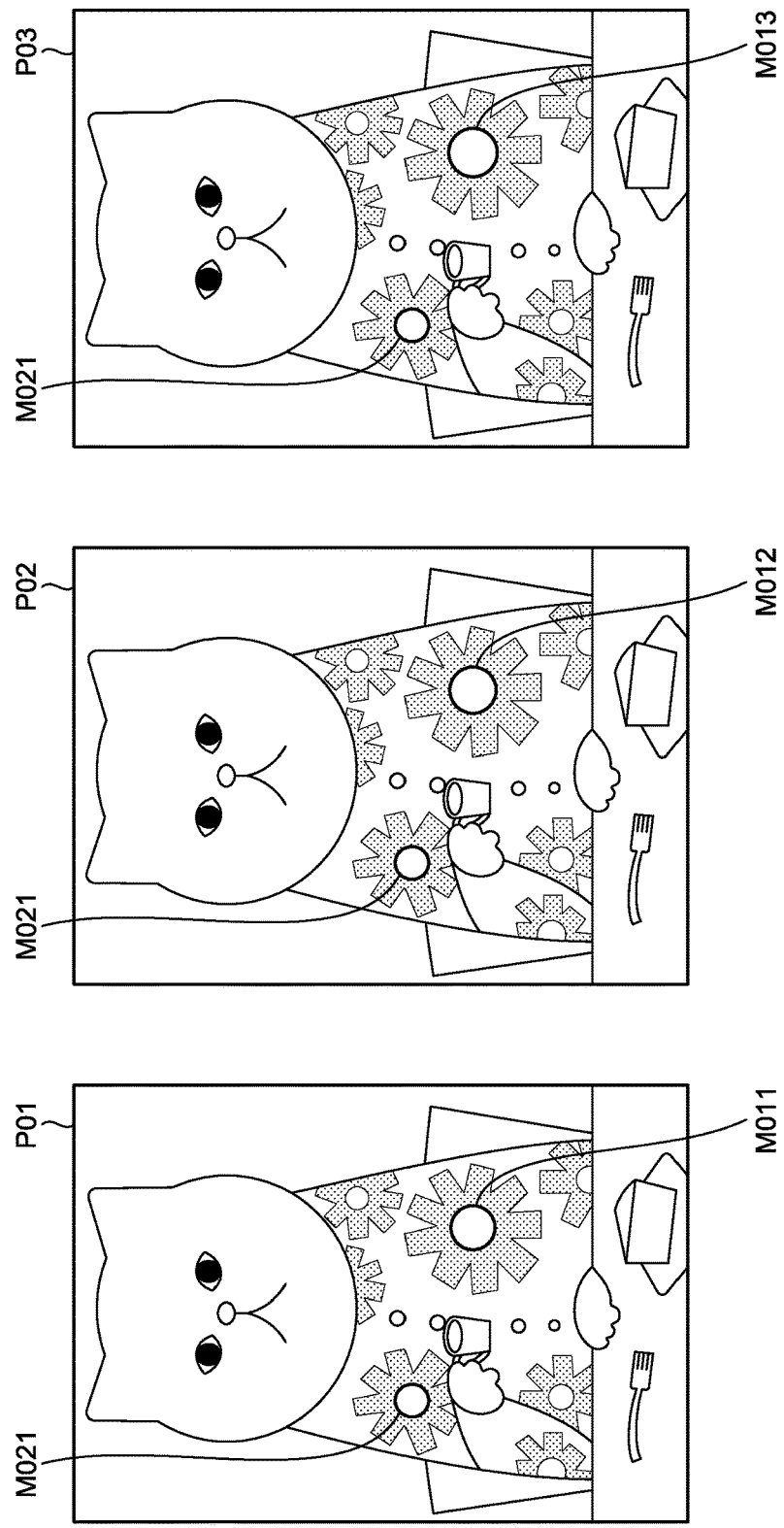
FIG. 2 is a schematic diagram (2) illustrating an example of image data according to the embodiment.

In the following, the ratio of the diameter of the variation circle will be described with reference to FIG. 2. FIG. 2 is a schematic diagram (2) illustrating an example of image data according to the embodiment. In the example illustrated in FIG. 2, it is assumed that the variation circle M011 included in the image data P01 is the circle in which the ratio of the diameter of the variation circle with respect to the predetermined reference is "1". Furthermore, it is assumed that the variation circle M012 included in image data P02 is the circle in which the ratio of the diameter of the variation circle with respect to the predetermined reference is "1.05".

Furthermore, it is assumed that the variation circle M013 included in image data P03 is the circle in which the ratio of the diameter of the variation circle with respect to the predetermined reference is "1.1".

It is assumed that the image processing device 100 has already registered, on the basis of the image data P01, both the reference circle M021 and the variation circle M011 as the pair detected as markers. Furthermore, regarding the markers associated in a case in which the ratio of the diameter of the variation circle M011 is changed, the image processing device 100 also can register both the reference circle M021 and the variation circle M011 such that both the circles are detected as different markers. For example, the image processing device 100 can register the pair of the variation circle M012 in which the ratio of the diameter of the variation circle with respect to the predetermined reference to that of the variation circle M011 is "1.05" and the reference circle M021 as markers that are different from the markers of the pair of the reference circle M021 and the variation circle M011. Furthermore, the image processing device 100 can register the pair of the variation circle M013 in which the ratio of the diameter of the variation circle with respect to the predetermined reference to that of the variation circle M011 is "1.1" and the reference circle M021 as markers that are different from the markers of the pair of the reference circle M021 and the variation circle M011 or the pair of the reference circle M021 and the variation circle M012. Namely, the image processing device 100 sets and registers the identifier as a different marker for each ratio of the variation circle.

For example, it is assumed that a user sends image data including the image data P02 to the image processing device 100. In this case, on the basis of the positional relationship between the reference circle M021 and the variation circle M012, the image processing device 100 detects that these circles are the registered markers. Furthermore, on the basis of the ratio of the diameter held by the variation circle M012, the image processing device 100 detects the identifier that is set to the subject marker. Namely, on the basis of the ratio of the diameter held by the variation circle M012, the image processing device 100 can uniquely specify the subject marker. This means that, from the similarity of the subjects (in this case, the illustrations of cats) included in the image data, even if the data is the image data P01, the image data P02, or the image data P03 that is assumed to be recognized as the same image by a user (person), the image processing device 100 can detect the data as different markers from each of the images.

Furthermore, regarding the markers in each of which the ratio varies in this way, the image processing device 100 does not need to acquire and register all of the pieces of image data. Namely, if the image processing device 100 has set one of the two perfect circles extracted from a single piece of the image data P01 as a variation circle, by only accepting the setting of the ratio of the diameter of the subject variation circle, the image processing device 100 can register the pair of each of the variation circles having different ratios and the reference circle as identifiable markers.

Figure 3:
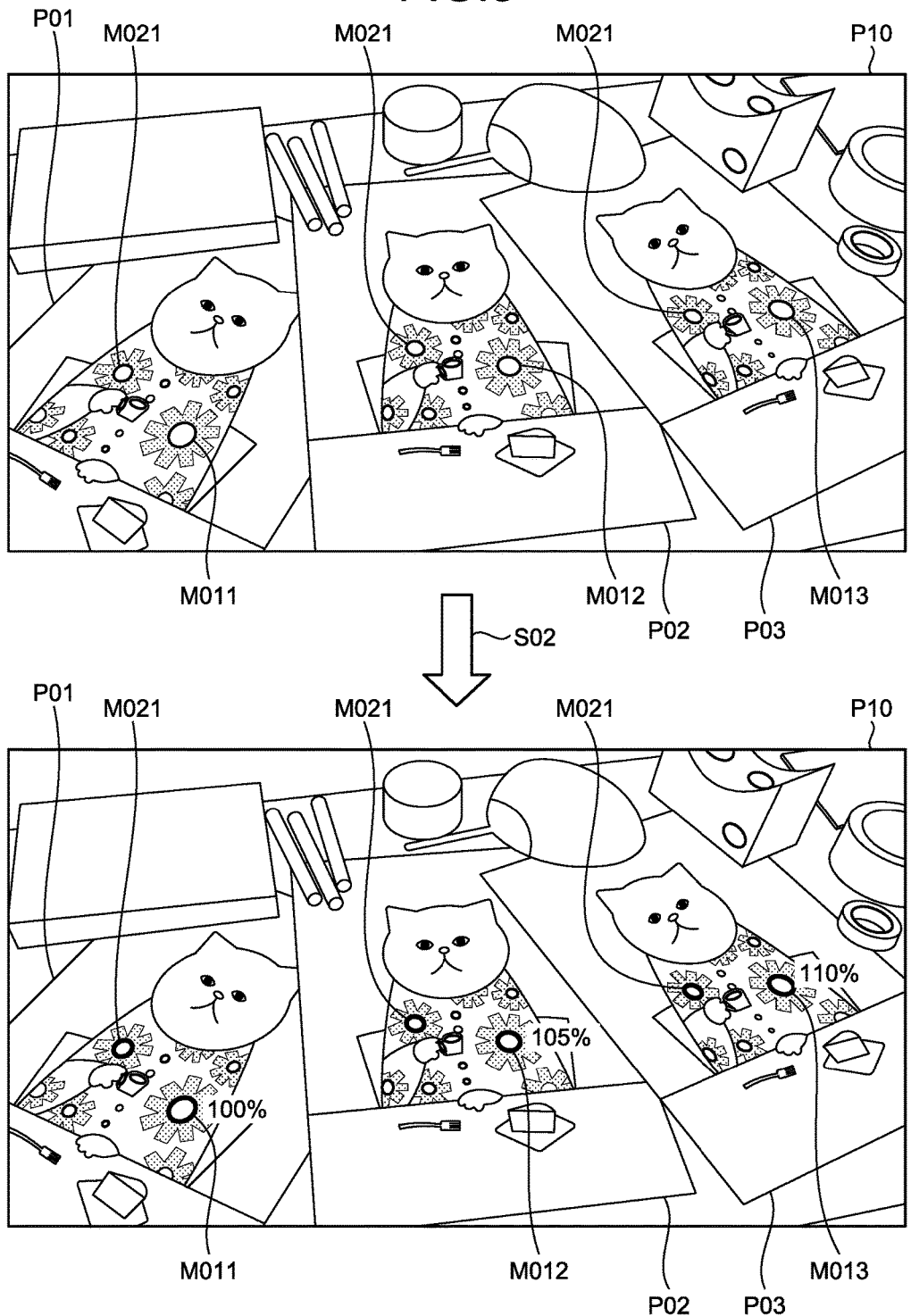
FIG. 3 is a schematic diagram illustrating an example of a detecting process according to the embodiment.

In the following, a process of detecting markers actually performed by the image processing device 100 will be described with reference to FIG. 3. FIG. 3 is a schematic diagram illustrating an example of a detecting process according to the embodiment. FIG. 3 illustrates a case in which, regarding image data P10 in which all of the image data P01, the image data P02, and the image data P03 are included, the image processing device 100 performs a process of detecting markers.

The image processing device 100 accepts, from a user, the image data P10 that includes therein images associated with the image data P01, the image data P02, and the image data P03. In the example illustrated in FIG. 3, the images associated with the image data P01, the image data P02, and the image data P03 mentioned here are the pieces of the associated image data that are printed out on a sheet of paper. For example, it is assumed that the user creates the image data P10 by placing the subject images on a table and capturing the images by a digital camera, or the like.

At this point, if a perfect circle is captured, in the captured image, a perfect circle is displayed as an ellipse except for a special case, such as a case in which a camera captures a perfect circle straight from the front. For example, as illustrated in FIG. 3, the reference circles M021, the variation circle M011, the variation circle M012, and the variation circle M013 are displayed as ellipses in the image data P10.

Thus, if the image processing device 100 accepts an image from a user, first, the image processing device 100 detects circular diagrams including ellipses included in the subject image. As illustrated in the upper portion in FIG. 3, the image processing device 100 detects the circles included in the image data P10. Furthermore, other than the reference circles M021 and the variation circle M011 that are detected as markers, the image processing device 100 detects a diagram as a circle as long as the diagram can be judged as a circle.

Subsequently, the image processing device 100 creates the pairs by combining each of the plurality of detected circles. Then, the image processing device 100 judges the positional relationship of each of the pairs. In this judgement process, the image processing device 100 performs a projective transformation process on the image data that becomes the processing target. For example, the image processing device 100 performs projective transformation on the basis of the ellipse parameter (for example, the length of the major axis and the length of the minor axis of an ellipse and the line segment extended from the major axis and the minor axis) of the two ellipses that are targeted for the processing, such that the subject ellipses becomes the perfect circle viewed from the front. By way of such a projective transformation process, the image processing device 100 detects the pair, from among all of the circles included in the image data P10, that has the positional relationship and that has been registered as the markers (Step S02).

The lower portion illustrated in FIG. 3 indicates the pair detected by the image processing device 100 as the markers in the image data P10. As illustrated in the lower portion of FIG. 3, the image processing device 100 detects, from the paired positional relationship, the pair of the reference circle M021 and the variation circle M011, the pair of the reference circle M021 and the variation circle M012, and the pair of the reference circle M021 and the variation circle M013.

Furthermore, as illustrated in the lower portion of FIG. 3, the image processing device 100 judges that, regarding the reference circle M021 and the variation circle M011, the ratio of the diameter of the variation circle M011 is 1 (100%) with respect to the predetermined reference. Furthermore, regarding the reference circle M021 and the variation circle M012, the image processing device 100 judges that the ratio of the diameter of the variation circle M012 is 1.05 (105%) with respect to the predetermined reference. Furthermore, regarding the reference circle M021 and the variation circle M013, the image processing device 100 judged that the ratio of the diameter of the variation circle M013 is 1.1 (110%) with respect to the predetermined reference.

In this way, by previously registering the two circles included in the image as markers, the image processing device 100 can set a plurality of identifiable markers by only changing the ratio of the diameter of the variation circle. In other words, by only changing the diameter of the circle included in the image without changing the pattern included in the image very much, the image processing device 100 can set a plurality of markers that can be identified as different markers.

Furthermore, by performing the projective transformation process on each of the ellipses included in the image data, the image processing device 100 can appropriately detect the pair of the two circles that are previously registered as markers. Namely, even if the image that is used to detect as markers is captured from various angles, the image processing device 100 can detect the markers from the subject image data. Consequently, the image processing device 100 can perform robust image processing (stable image processing) on various situations. Regarding such processes, an example of a case in which a user actually uses the image processing device 100 will be described with reference to FIG. 4.

Figure 4:
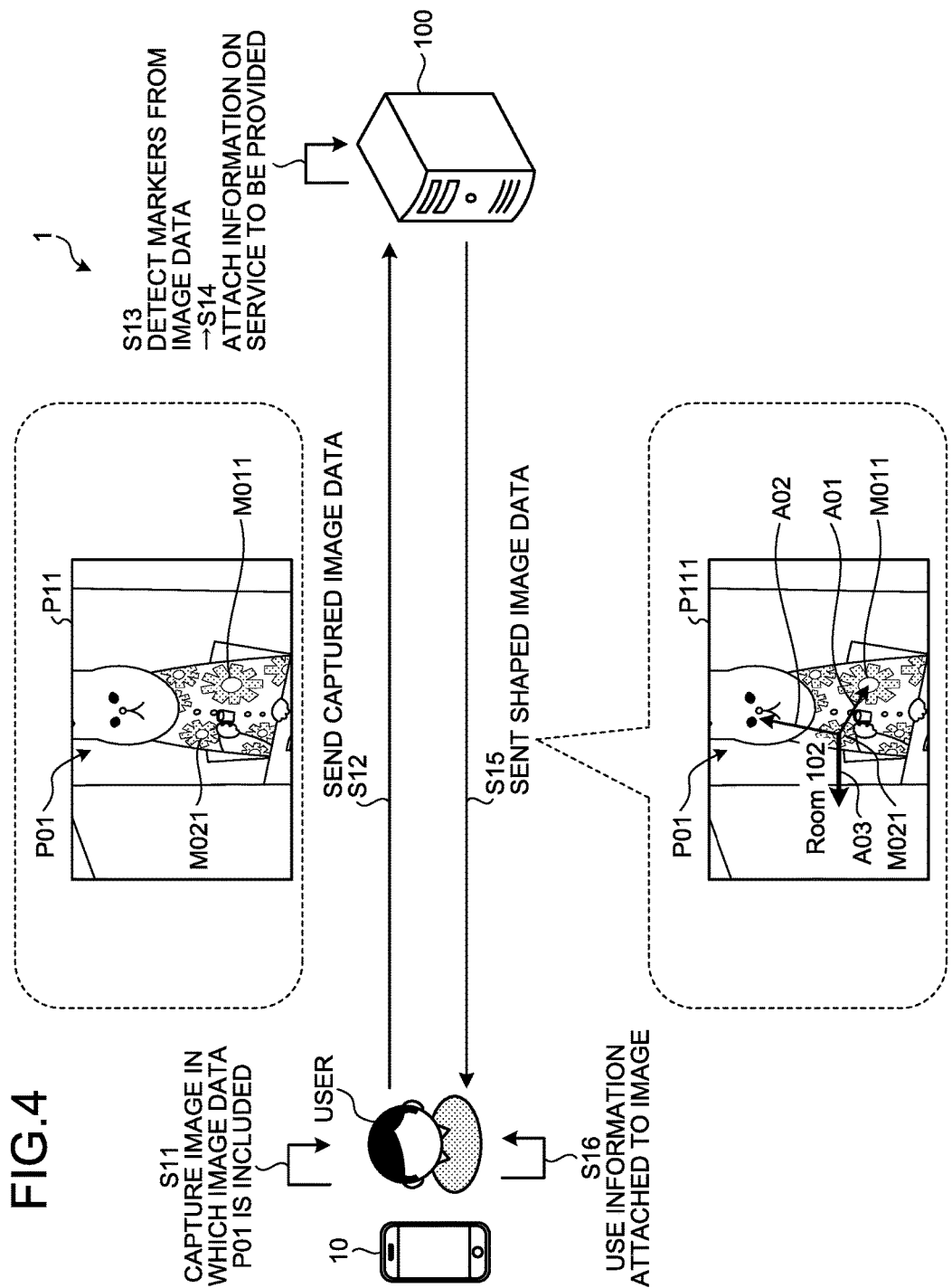
FIG. 4 is a schematic diagram illustrating an example of image processing according to the embodiment.

FIG. 4 is a schematic diagram illustrating an example of image processing according to the embodiment. In FIG. 4, the series of the flow of the image processing performed in an image processing system 1 will be described. As illustrated in FIG. 4, the image processing system 1 according to the embodiment includes a user terminal 10 and the image processing device 100. The user terminal 10 and the image processing device 100 are connected via a network N (for example, the Internet), which is not illustrated, such that they can be communicated with each other. Furthermore, the number of devices included in the image processing system 1 is not limited to the example illustrated in FIG. 4. For example, in the image processing system 1, a plurality number of the user terminals 10 may also be included.

The user terminal 10 is an information processing apparatus that is used by a user who requests the image processing device 100 to shape the image by using markers or to receive an information providing service by using markers. For example, the user terminal 10 is implemented by a mobile phone terminal, such as a smart phone, a tablet terminal, or the like. Furthermore, the user terminal 10 may also be a desktop type personal computer (PC), a notebook type PC, a personal digital assistant (PDA), or the like. Furthermore, the user terminal 10 may also include a capturing function (for example, a camera application) of capturing a subject, a lens that is used to capture an image, or the like. Furthermore, in the following, a user may also sometimes be read as the user terminal 10. For example, in some cases, the description of "a user capturing a predetermined diagram" means that, in practice, "the user terminal 10 used by a user captures a predetermined diagram".

In the embodiment, the user who uses the user terminal 10 is a user who receives various services from the image processing device 100 by capturing diagrams registered as, for example, markers. Specifically, a user can receive various services by capturing the diagrams displayed in, for example, a city or a company and sending the image data acquired by the capturing to the image processing device 100.

The image processing device 100 is a server device that performs image processing according to the embodiment. Specifically, the image processing device 100 according to the embodiment acquires the image data in which a diagram that is registered as the marker from a user. Then, the image processing device 100 detects the diagram (feature point) included in the image data as the marker that is used for the image processing. Then, the image processing device 100 performs a predetermined shaping process that is set in the detected marker. In the following, the image processing performed by the image processing device 100 will be described along the flow of the process.

First, a user creates image data that is the original of the image processing. For example, the user creates the image data including the image data P01 that includes therein both the reference circle M021 and the variation circle M011 that are diagrams detected as markers. For example, if the image associated with the image data P01 that includes therein the subject markers is a poster, or the like, that is displayed at an arbitrary location, the user can creates, by capturing the subject poster or the like, the image data P11 that is the image data that includes therein the markers (Step S11). Due to such an operation performed by the user, the user terminal 10 acquires the image data P11.

Subsequently, the user terminal 10 sends the image data P11 to the image processing device 100 in accordance with the operation performed by the user (Step S12). For example, by uploading the image data P11 in a web page that provides an image processing service performed by the image processing device 100, the user terminal 10 sends the image data indicated by the image data P11.

The image processing device 100 accepts, from the user terminal 10, the image data P11 in which at least two circle diagrams are included in the image. The image processing device 100 detects whether the diagrams that have already been registered as the markers are included in the accepted image data P11. In other words, the image processing device 100 performs the detecting process of the markers on the image data P11 (Step S13). As described with reference to FIG. 3, the image processing device 100 extracts a plurality of circular diagrams in the image and detects the paired positional relationship that is the same pair as that previously stored as the markers. Furthermore, if the pair has been detected on the basis of the positional relationship, the image processing device 100 calculates the ratio of the diameter of the variation circle. Then, by identifying the markers on the basis of the ratio of the diameter, the image processing device 100 uniquely specifies the markers included in the image data P11.

Subsequently, the image processing device 100 refers to the shaping information that has been set in the specified markers. Then, the image processing device 100 attaches the set shaping information to the markers that are included in the image data P11. In other words, the image processing device 100 attaches, to the image data P11, information on the service that is associated with the specified markers and that is to be provided to the user (Step S14).

In the example illustrated in FIG. 4, it is assumed that the image processing device 100 provides, as a service, a guide service using the markers. In this case, the image processing device 100 specifies the markers included in the image data P11 and attaches the information that has been set in the subject markers to the image data P11, whereby the image processing device 100 shapes the image data P11 to new image data P111.

Specifically, as illustrated in FIG. 4, the image processing device 100 performs the AR process at the position of the markers that are specified in the image data P11 and then attaches the arrows for the guiding. In FIG. 4, in the image data P111, compared with the image data P11, an arrow A01, an arrow A02, and an arrow A03 are added. Furthermore, in the image data P111, the letter such as, a "Room 102", is added in the vicinity of the arrow A03.

For example, the image processing device 100 attaches the arrow A01 on the basis of the positional relationship between the reference circle M021 and the variation circle M011. Furthermore, the image processing device 100 attaches the arrow A02 in the direction of the right angle with respect to the arrow A01 in the image data P11. Furthermore, the image processing device 100 attaches the arrow A03 in the direction of the normal line with respect to the plane specified by the arrow A01 and the arrow A02. This indicates that, in the image processing device 100, the position information that indicates the position in which the image data P01 is displayed has previously been registered and indicates that the content (in the example illustrated in FIG. 4, information or the like indicating the presence of the room indicated by the "Room 102" is present in the direction of the normal line from the location in which the image data P01 is displayed) that is displayed, in a superimposed manner, as a guide with respect to the markers included in the image data P11.

Furthermore, if the markers included in the image data P01 are not constituted by the variation circle M011 but constituted by the variation circle M012, the image processing device 100 can also attach, to the image data P11, the information (for example, an arrow in the different direction, information indicating a different room number, or the like) that is different from that used in the variation circle M011.

Then, the image processing device 100 sends, to the user terminal 10, the image data P111 that is the shaped image data (Step S15). The user terminal 10 receives the image data P111. Then, the user uses the information attached to the image data P111 (Step S16). Namely, by capturing the image data P11, by sending the image data P11 to the image processing device 100, and by receiving a reply of the image data P111, the user can acquire, via the user terminal 10 from the AR process performed by the image processing device 100, guide information that is not obtained by only viewing the image data P11 in the real world.

As described above, the image processing device 100 according to the embodiment accepts image data in which at least two diagrams that can be extracted as circles. Then, by checking a parameter that is calculated from the pair of two circles that are included in the accepted image data against a parameter that is calculated from the pair of two perfect circles that have previously been registered as markers that are used for the image processing, the image processing device 100 specifies, as the markers, the pair of the two circles that are included in the subject image data.

In this way, the image processing device 100 according to the embodiment can specify the two circles included in the image as the markers that are used in the predetermined image processing. Consequently, the image processing device 100 can perform the image processing, such as the AR process, or the like, without including a special marker, such as the QR code, in the image data. Namely, in the image processing, the image processing device 100 can use the image data that includes therein the markers without causing any discomfort for a user.

2. Configuration of the Image Processing Device

Figure 5:
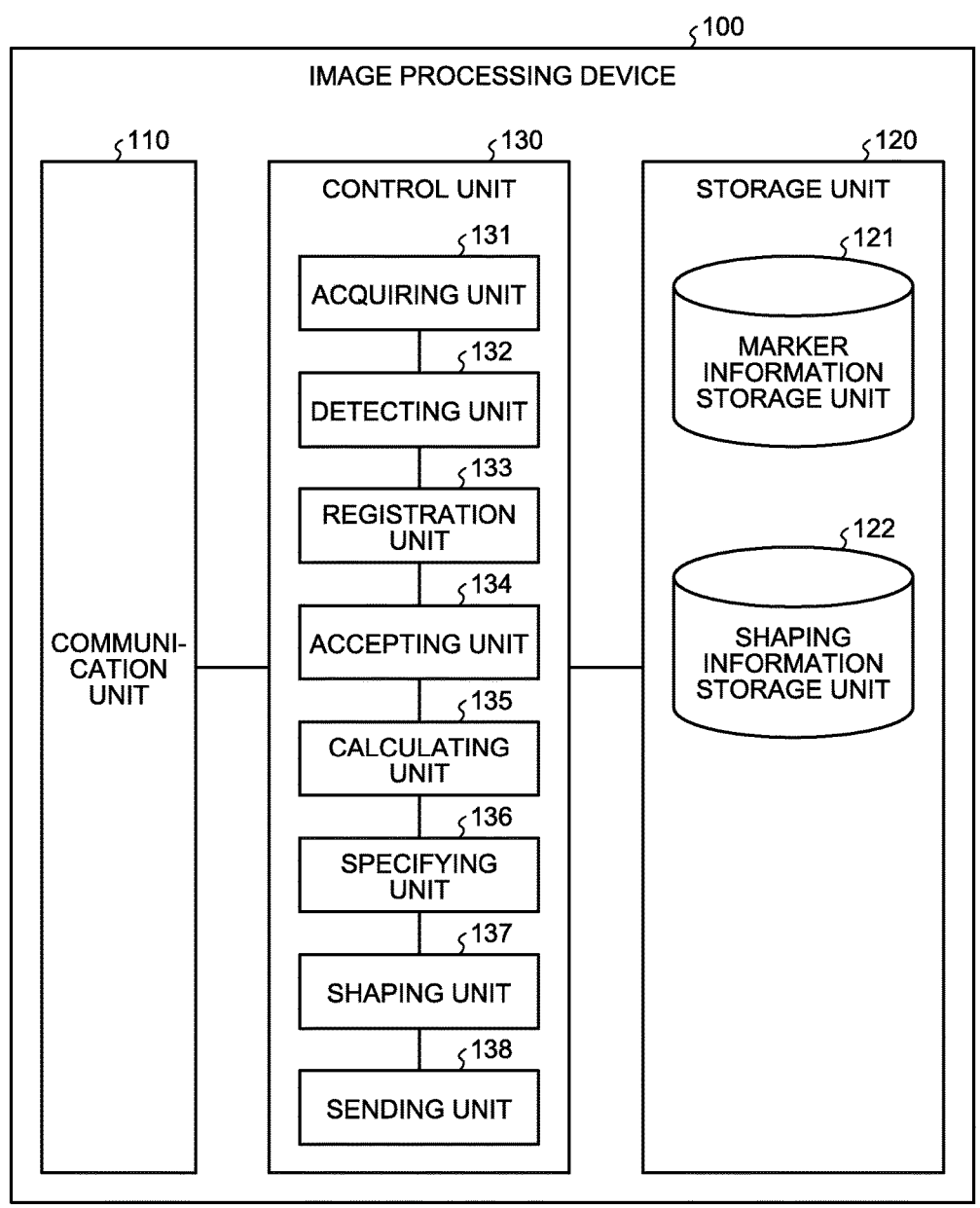
FIG. 5 is a block diagram illustrating a configuration example of an image processing device according to the embodiment.

In the following, the configuration of the image processing device 100 according to the embodiment will be described with reference to FIG. 5. FIG. 5 is a block diagram illustrating a configuration example of the image processing device 100 according to the embodiment. As illustrated in FIG. 5, the image processing device 100 includes a communication unit 110, a storage unit 120, and a control unit 130.

About the Communication Unit 110

The communication unit 110 is implemented by, for example, a network interface card (NIC), or the like. Furthermore, the communication unit 110 is connected to the network N (not illustrated) in a wired or a wireless manner and sends and receives information to and from the user terminal 10.

About the Storage Unit 120

The storage unit 120 is implemented by, for example, a semiconductor memory device, such as a random access memory (RAM), a flash memory, and the like, or implemented by a storage device, such as a hard disk, an optical disk, or the like. As illustrated in FIG. 5, the storage unit 120 includes a marker information storage unit 121 and a shaping information storage unit 122.

About the Marker Information Storage Unit 121

Figure 6:
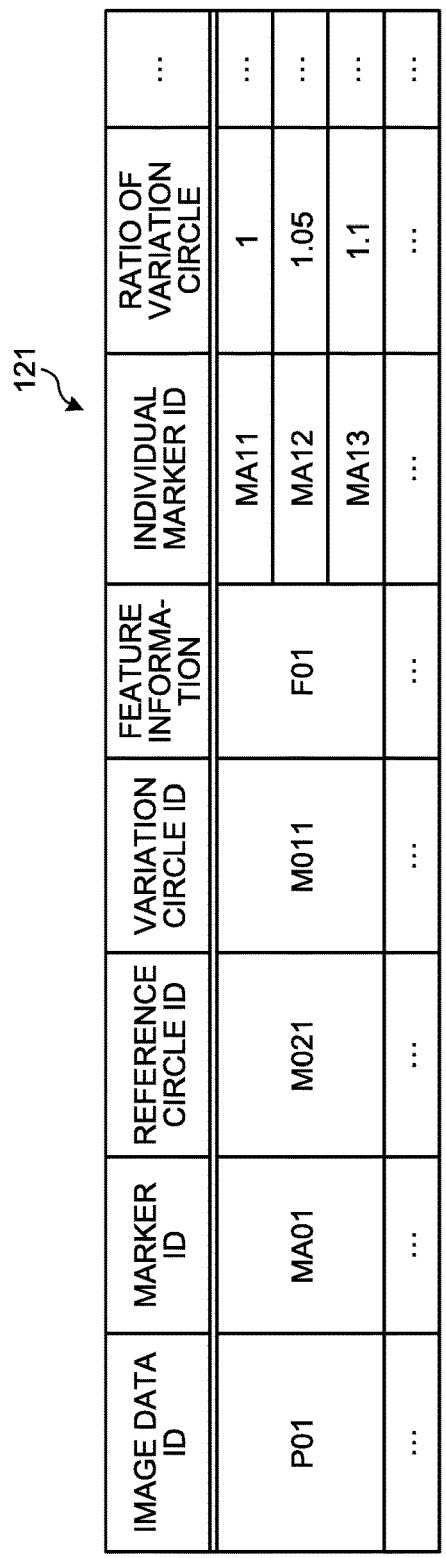
FIG. 6 is a schematic diagram illustrating an example of a marker information storage unit according to the embodiment.

The marker information storage unit 121 stores therein information related to the markers that are registered in the image processing device 100. Here, FIG. 6 illustrates an example of the marker information storage unit 121 according to the embodiment. In the example illustrated in FIG. 6, the marker information storage unit 121 has items, such as the "image data ID", the "marker ID", the "reference circle ID", the "variation circle ID", the "feature information", the "individual marker ID", the "ratio of the variation circle", and the like.

The "image data ID" indicates the identification information for identifying the image data submitted from a user to the image processing device 100 when a marker is registered. Furthermore, in the information indicated by the image data ID, for example, the date and time of the submission or the information for identifying the user terminal 10 that is the submission source may also be included. Furthermore, in the embodiment, the identification information may sometimes be used as reference numeral. For example, it is assumed that the image data with the image data ID of "P01" indicates the "image data P01".

The "marker ID" indicates the identification information for identifying a marker. The "reference circle ID" indicates the identification information for identifying the reference circle. The "variation circle ID" indicates the identification information for identifying the variation circle. Furthermore, as described above, a user can arbitrarily assign the reference circle and the variation circle.

The "feature information" is the information that is used to uniquely specify a marker and that indicates the marker. For example, the feature information is a variable (parameter) that indicates the positional relationship between the reference circle and the variation circle. In the example illustrated in FIG. 6, the feature information is indicated by the concept, such as "F01"; however, in practice, in the item of the feature information, the parameter or the like that is used to uniquely specify the marker is stored.

The "individual marker ID" indicates the identification information on the marker at the time when the marker is identified for each of the ratio of the diameter of the variation circle. The "ratio of the variation circle" indicates the ratio of the diameter of the variation circle with respect to the predetermined reference.

Namely, FIG. 6 indicates that the image data P01 identified by the image data ID "P01" is submitted from a user and the marker ID of the marker registered in the image data P01 is "MA01". Furthermore, FIG. 6 indicates that the marker MA01 is the marker related to the pair of the reference circle M021 that is identified by the reference circle ID "M021" and the variation circle M011 that is identified by the variation circle ID "M011" and indicates that the feature information thereof is "F01". Furthermore, FIG. 6 indicates that the individual marker IDs for the respective ratios of the diameter are "MA11", "MA12", and "MA13" and indicates that the respective ratios of the diameter are "1", "1.05", and "1.1".

About the Shaping Information Storage Unit 122

Figure 7:
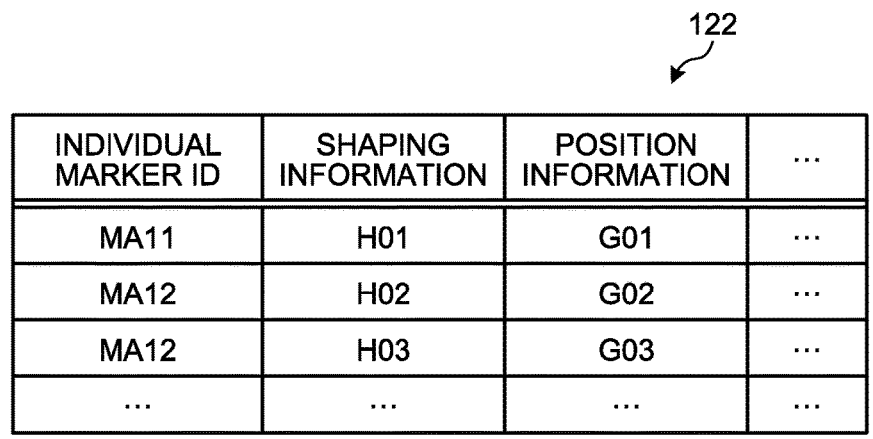
FIG. 7 is a schematic diagram illustrating an example of a shaping information storage unit according to the embodiment.

The shaping information storage unit 122 stores therein the content of a predetermined image shaping process performed on a specified marker. Here, FIG. 7 illustrates an example of the shaping information storage unit 122 according to the embodiment. The shaping information storage unit 122 illustrated in FIG. 7 has items, such as the "individual marker ID", the "shaping information", the "position information", and the like.

The "individual marker ID" corresponds to the same item as that illustrated in FIG. 6. The "shaping information" indicates the content of the image processing that is performed on a marker when the marker is specified. In the example illustrated in FIG. 7, the shaping information is indicated by the concept, such as "H01"; however, in practice, in the item of the shaping information, the content (for example, a process of displaying the arrow A01 or the like illustrated in FIG. 4) of the shaping process that is performed on a marker, the image data on the object to be superimposed on the position of the marker, the text data to be displayed at the position of the marker, or the like are stored.

The "position information" indicates the information on the position in which a marker has been disposed. The position in which the marker has been disposed indicates the position in which, if, for example, the marker is included in the image data, the image (for example, a poster, etc.) associated with the subject image data is displayed. In the example illustrated in FIG. 7, the position information is indicated by the concept, such as "G01"; however, in practice, in the item of the position information, the longitude, the latitude, or the like that indicates the position in which the marker has been disposed is stored. Furthermore, in the position information, for example, the information on the direction of the marker to be disposed, the height of the disposition, or the like may also be stored.

Namely, FIG. 7 indicates that, for the marker MA11 identified by the individual marker ID "MA11", the shaping information "H01" is set and the marker MA11 is disposed at the location indicated by the position information "G01". Furthermore, the shaping information or the position information may also appropriately be updated by an administrator or the like of the image processing device 100 in accordance with the use state of the marker.

About the Control Unit 130

The control unit 130 is, for example, a controller and is implemented by a central processing unit (CPU), a micro processing unit (MPU), or the like, executing various kinds of programs (corresponding to an example of an image processing program), which are stored in a storage device in the image processing device 100, by using a RAM as a work area. Furthermore, the control unit 130 is a controller and is implemented by, for example, an integrated circuit, such as an application specific integrated circuit (ASIC), a field programmable gate array (FPGA), or the like.

The control unit 130 includes, as illustrated in FIG. 5, an acquiring unit 131, a detecting unit 132, a registration unit 133, an accepting unit 134, a calculating unit 135, a specifying unit 136, a shaping unit 137, and a sending unit 138 and implements or executes the function or the operation of the information processing described below. Furthermore, the internal configuration of the control unit 130 is not limited to the configuration illustrated in FIG. 5 but another configuration may also be used as long as the configuration in which the information processing, which will be described later, is used. Furthermore, the connection relation between the processing units included in the control unit 130 is not limited to the connection relation illustrated in FIG. 5 and another connection relation may also be used.

About the Acquiring Unit 131

The acquiring unit 131 acquires various kinds of information. For example, the acquiring unit 131 acquires the image data that is sent from a user and that includes therein a circular diagram. Specifically, the acquiring unit 131 acquires, from a user who desires to register the marker in the image processing device 100, the image data that includes therein two perfect circles that can be registered as the markers.

About the Detecting Unit 132

The detecting unit 132 detects, from the image data acquired by the acquiring unit 131, a circle that is used to register as a marker. Specifically, the detecting unit 132 detects a perfect circle that is a circular diagram included in the image data and in which the major axis and the minor axis are substantially the same.

The detecting unit 132 detects a circular diagram by using various known methods. For example, the detecting unit 132 detects a feature value of each of the neighboring pixels in the image data. For example, the detecting unit 132 detects data indicating a color of the pixel. Then, the detecting unit 132 detects the circular diagram by detecting a portion in which a color difference is equal to or greater than a predetermined threshold. Furthermore, the detecting unit 132 may also detect a circular diagram by using the Taubin method, or the like.

Furthermore, if a circular diagram is not a perfect circle in the image data acquired by the acquiring unit 131, the detecting unit 132 detects a perfect circle by performing the projective transformation described above. The case in which the circular diagram in the image data acquired by the acquiring unit 131 is not the perfect circle corresponds to the case in which, for example, the acquiring unit 131 acquires the image data that is created by a user capturing the perfect circle.

In general, the projective transformation process related to the image data performed by using a marker is implemented by calculating the parameter of the angle of rotation R and the amount of parallel translation T between the marker (in the embodiment, the perfect circle that is before registered as a marker) in the image data and the image capturing device (for example, the user terminal 10 or the digital camera) that captures the image of the image data.

Here, the projective transformation process performed by the image processing device 100 according to the embodiment will be described by using the image data P01 as an example. First, the image processing device 100 detects the circle in the original image data P01. In this example, it is assumed that the image processing device 100 detects the circle M01 and the circle M02. As described above, the circle M01 and the circle M02 included in the image data P01 are the perfect circle; however, in the image in which the image data P01 is captured, the circle M01 and the circle M02 are ellipses.

The image processing device 100 estimates the normal line of each of the ellipses on the basis of the parameter of each of the detected ellipses. The normal lines of an ellipse calculated are two for each ellipse. Consequently, by combining the solution of the normal line calculated from the two circles, i.e., the circle M01 and the circle M02, the image processing device 100 can estimate the plane including the circle M01 and the circle M02. Furthermore, the image processing device 100 can estimate the estimated normal lines on the plane.

The image processing device 100 assumes that the estimated normal line on the plane is the Y-axis in the world coordinate system (the coordinate system that is used to indicate the substance in a space, which is sometimes referred to as the "world coordinate system" or the "global coordinate system") in the original image data P01. Then, the image processing device 100 sets the vector connecting appropriate centers (for example, the center of the circle M01 and the circle M02) as the temporary X-axis in the world coordinate system. On the basis of the pieces of the information, the image processing device 100 can obtain the relationship of the angle of rotation R between the circle M01 or M02 in the image and the image capturing device. Furthermore, by assuming that the distance between the centers is 1, the image processing device 100 can calculate the amount of parallel translation T. If the image processing device 100 obtains the original magnitude relation of the detected circles by using the angle of rotation R and the amount of parallel translation T that are the temporary parameters, the image processing device 100 can decide which of the circles can be detected as an ellipse. Furthermore, because the position information on the circles in the image data P01 is known, on the basis of the position of the detected circles in the world coordinate system, the image processing device 100 can estimate the correct X-axis and the correct amount of parallel translation T. Consequently, the image processing device 100 can detect the perfect circle from the projective transformation even if the perfect circle is captured and the image is displayed as an ellipse. Furthermore, the projective transformation process may also be performed by the calculating unit 135 or the specifying unit 136, which will be described later.

Figure 8:
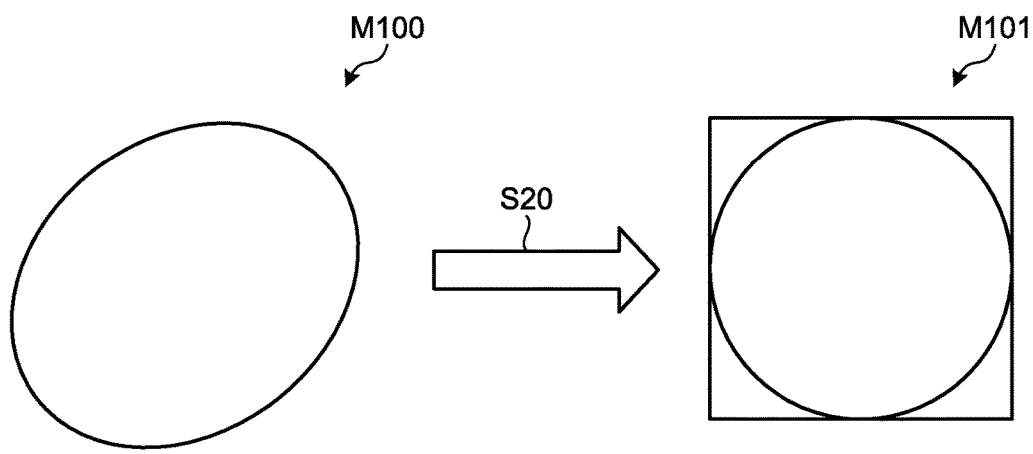
FIG. 8 is a schematic diagram illustrating an example of a transformation process according to the embodiment.

For example, FIG. 8 is illustrated as an example of a diagram illustrating the stat in which the projective transformation process has been performed. FIG. 8 is a schematic diagram illustrating an example of a transformation process according to the embodiment. It is assumed that the detecting unit 132 has performed the projective transformation process on a circle M100 that is indicated as an ellipse in the image data (Step S20). Because the circle M100 has been subjected to the projective transformation process, the circle M100 is consequently transformed into the image data that is identified as the perfect circle M101.

About the Registration Unit 133

The registration unit 133 registers a marker that is used for the image processing. Specifically, the registration unit 133 registers, regarding the image data that includes therein at least two perfect circles, at least one of the perfect circles as a variation circle that is a circle in which the ratio of the diameter with respect to the predetermined reference is calculated, a circle that is other than the variation circle and that serves as a reference for calculating both the ratio of the diameter of the variation circle and a value that indicates the positional relationship between the two perfect circles as a reference circle, and a set of the pair of the variation circle and the reference circle as the markers.

For example, the registration unit 133 displays, on the user terminal 10, the perfect circle detected by the detecting unit 132. Then, the registration unit 133 accepts, from a user via the user terminal 10, the assignment indicating which of the pair of the perfect circles as the markers. Furthermore, the registration unit 133 accepts the assignment of the reference circle and the variation circle from among the pairs.

The registration unit 133 stores the assigned reference circle and the variation circle in the marker information storage unit 121 together with the feature information that is used to specify the markers. For example, the registration unit 133 registers the parameter that indicates the positional relationship between the two circles that serve as the pair.

The registration unit 133 may also use various kinds of known information as the parameter that indicates the positional relationship between the two circles. For example, if the registration unit 133 has already acquired the mapping data that indicates the relationship between the pixel data that constitutes the image data and the coordinates that indicates the position of the perfect circle in the image data, the registration unit 133 may also register the parameter that indicates the positional relationship between the two circles by using the subject information.

Furthermore, the registration unit 133 may also obtain the value of the trace in an equation that indicates the two circles. In general, the equation of a circle can be represented by the equation below.

$$ax^2+2bxy+cy^2+2dx+2ey+f=0 \quad (1)$$

In Equation (1), x and y represent the coordinates on the image data. Regarding the elements (a to f) constituting the Equation (1), in general, an approximate value can be obtained by using the vector and the matrix. First, the relationship of Equation (2) holds.

$$X^tMX=0 \quad (2)$$

In Equation (2), X represents the vector. Furthermore, $X^t$ indicates the transposed vector. Furthermore, it is assumed that X is indicated by Equation (3) below.

$$X=(x,y,1) \quad (3)$$

In Equation (2) above, M is indicated as the matrix that satisfies the relationship between Equation (1) above and Equation (4) below.

$$M = \begin{pmatrix} a & b & d \\ b & c & e \\ d & e & f \end{pmatrix} \quad (4)$$

Then, the traces of the reference circle $M_k$ and the variation circle $M_h$ can be represented by the equations below (it is assumed that "k" corresponding to a subscript represents a reference and "h" represent a change. Furthermore, for a subscript, "s" may also be used as the meaning of standard or "v" may also be used as the meaning of variable).

$$I_{M_kM_h}=\text{Trace}(M_k^{-1}M_h) \quad (5)$$

$$I_{M_kM_h}=\text{Trace}(M_h^{-1}M_k) \quad (6)$$

The registration unit 133 may also register, as the feature information, the values of the trace of the reference circle $M_k$ and the variation circle $M_h$ that are obtained described above. For example, the registration unit 133 registers the values (I) of the traces of the two circles obtained by using Equation (5) and (6) described above. Then, for example, if the registered values of the traces and the values of the traces of the circles included in the image data that has been accepted by the accepting unit 134 are within a predetermined threshold, the specifying unit 136 can specify the circles included in the image data accepted by the accepting unit 134 as the markers that have been registered.

Furthermore, the registration unit 133 registers the ratio of the diameter with respect to the predetermined reference of the variation circle. For example, the registration unit 133 registers the ratio of the diameter assigned by a user and registers each of the registered ratios of the diameters as different markers.

In this case, the registration unit 133 may also register the ratio of the diameter together with the parameter that is used to calculate the ratio of the diameter. Namely, in the image data that is used by the specifying unit 136, which will be described later, to specify a marker, it is assumed that the diagram specified as a marker is an ellipse and it is assumed that the projective transformation process is performed in the specifying process. In this case, if the registration unit 133 simply registers only the value of the ratio of the diameter, the value may possibly be inconsistent between the data at the time of registration and the data on the circle in the image data accepted by the accepting unit 134 due to distortion caused by projective transformation. Consequently, even if the projective transformation has been performed, the registration unit 133 registers the ratio of the diameter by using an invariable parameter.

For example, the registration unit 133 registers the proportion of the radius of the reference circle to that of the variation circle by using the ratio of the diameter of the reference circle as a predetermined reference. If projective transformation has been performed on the variation circle, because the projective transformation is similarly performed on the reference circle that is used to specify the ratio of the diameter of the subject variation circle, the registration unit 133 can register an invariable parameter by using the proportion of the radius of the reference circle to that of the variation circle even after the projective transformation has been performed.

Figure 9:
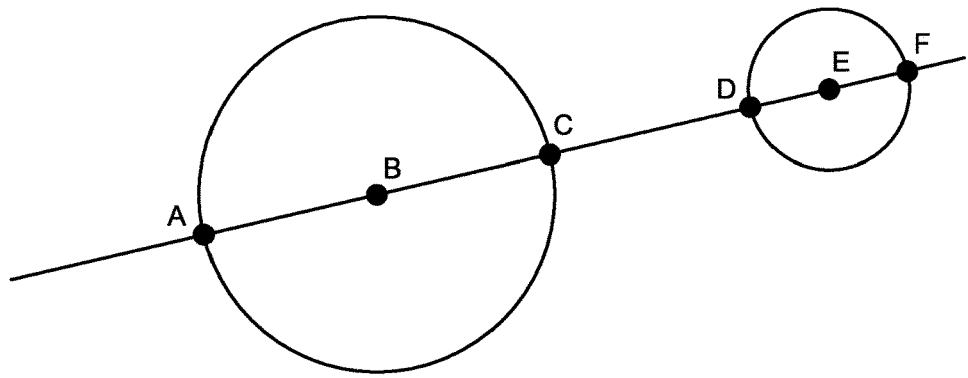
FIG. 9 is a schematic diagram illustrating an example of a calculation process according to the embodiment.

Furthermore, as another example, the registration unit 133 may also register, as a parameter, the cross ratio obtained by using the center or the radius of the reference circle and the variation circle. This point will be described by using FIG. 9. FIG. 9 is a schematic diagram illustrating an example of a calculation process according to the embodiment. As illustrated in FIG. 9, if each of the points is disposed on the line passing through the center of the two circles, the following relationships are established.

$$(BC/BE):(AC/AE)=(AE*BC)/(AC*BE)=0.5*(AB/BE+1) \quad (7)$$

$$(ED/BE):(FD/FB)=(FB*ED)/(FD*BE)=0.5*(FE/BE+1) \quad (8)$$

For example, the registration unit 133 can register Equation (7), Equation (8), or the like described above as the parameter. This is because, if it is assumed that the two circles illustrated in FIG. 9 are the reference circle and the variation circle, the distance between the centers BE is constant irrespective of the length of the diameter of the variation circle. Namely, the parameters described above are changed only due to a change in the diameter of the variation circle. Specifically, the phenomenon in which the ratio of the diameter of the variation circle is "1" or "1.1" can be specified by calculating Equation (7) or (8) described above. Furthermore, if the cross ratio is used, the calculation process can be performed by using the ellipse in the image data without changing anything; therefore, the processing load can be reduced because the time and effort needed to perform projective transformation process can be eliminated.

About the Accepting Unit 134

The accepting unit 134 accepts the image data submitted from the user terminal 10. Specifically, the accepting unit 134 accepts the image data that includes therein at least two diagrams that can be extracted as circles. The accepting unit 134 may also directly accept the image data from the user terminal 10 or may also accept the image data via, for example, a web site or the like according to the image processing service provided by the image processing device 100.

About the Calculating Unit 135

The calculating unit 135 performs a predetermined calculation process on the image data accepted by the accepting unit 134. For example, the calculating unit 135 read image data and detects the circular diagram in the image data. This process may also be the same process as that described for the detecting unit 132. Then, the calculating unit 135 performs projective transformation on the detected circular diagram and detects the perfect circles.

Then, regarding the detected perfect circles, the calculating unit 135 calculates the parameter that indicates the positional relationship between the pair. For example, on the basis of the center of each of the detected perfect circles or the coordinate information on the predetermined pixels constituting the perfect circles, the calculating unit 135 calculates the positional relationship between the two circles. For example, if the mapping data in the image data serving as the original of the marker has been registered by the registration unit 133, the calculating unit 135 determines, on the basis of the mapping data, whether the parameter of the marker registered by the registration unit 133 and the parameter of the two circles in the image data accepted by the accepting unit 134 are within a predetermined threshold. For example, if it is calculated, by the calculating unit 135, that both the parameters are within the predetermined threshold, the specifying unit 136, which will be described later, specifies the two circles in the image data accepted by the accepting unit 134 as the markers.

Furthermore, regarding one of the circles between the two circles that are specified as the markers, the calculating unit 135 calculates the ratio of the diameter with respect to the predetermined reference. As described above, if the circles registered as the markers are captured as images, projective transformation process is performed on the image data. Consequently, there may sometimes be a case in which, if the calculating unit 135 simply calculates the length of the diameter in the image data, the calculating unit 135 is not able to accurately calculate the ratio of the diameters. Thus, the calculating unit 135 calculates the ratio of the diameters by using the invariable parameter even after the projective transformation has been performed.

As an example, the calculating unit 135 may also calculate the proportion of the radius of the reference circle to that of the variation circle by using the ratio of the diameter of the reference circle as a predetermined reference. Furthermore, as another example, the calculating unit 135 may also calculate the cross ratio of the centers or the radii of the reference circle and the variation circle, such as illustrated in FIG. 9. As described above, by calculating the parameter described above, the calculating unit 135 can calculate the ratio of the diameter in the variation circle. In other words, due to the calculation process performed by the calculating unit 135, the specifying unit 136 can uniquely specify the ratio of the diameter of the variation circle.

About the Specifying Unit 136

The specifying unit 136 specifies the markers included in the image data accepted by the accepting unit 134. Specifically, the specifying unit 136 specifies the pair of two circles included in the image data as the markers by checking the parameter calculated from the paired two circles included in the image data accepted by the accepting unit 134 against the parameter that is calculated from the pair of the two perfect circles that have already been registered as the markers that are used for the image processing. In this case, the pair of the two registered perfect circle indicates the pair of the two circles registered as the markers by the registration unit 133. Namely, the specifying unit 136 specifies the two circles included in the image data as the markers by checking the predetermined parameter calculated from the two circles included in the image data against the parameters associated with the markers registered by the registration unit 133.

For example, the specifying unit 136 specifies the two circles included in the image data as the markers by using, as the parameter, the value that indicates the positional relationship between the two circles and the ratio of the diameter of one of the two circles with respect to the predetermined reference. As the value indicating the similarity between the positional relationship between the two circles that are from among the registered markers and the positional relationship between the two circles that are accepted by the accepting unit 134, the specifying unit 136 may also use, for example, the mapping data described above or the value of the trace.

As an example, from among the predetermined parameters calculated from the two circles included in the image data, on the basis of the value of the ratio of the diameter of each of the variation circles with respect to the predetermined reference, the specifying unit 136 specifies which of the markers correspond to the markers that are registered in the registration unit 133. Namely, on the basis of the value of the ratio of the diameter of each of the variation circles with respect to the predetermined reference, if the ratio of the diameter differs even for the pair of the same reference circle and the variation circle, the specifying unit 136 can specify them as different markers. Consequently, even if the similar patterns are used in the image that includes therein the markers, because the image processing device 100 can specify them as different markers by slightly changing the diameter of the variation circles, the image processing device 100 can easily identify a large number of markers.

Furthermore, the specifying unit 136 may also perform projective transformation on the image data such that the circular diagram included in the image data accepted by the accepting unit 134 becomes the perfect circle and may also specify the markers included in the image data on the basis of the parameter held by a predetermined pair of the perfect circles that have been subjected to the projective transformation. In this way, by performing the projective transformation, the specifying unit 136 can accurately specify the markers without using, for example, the angle of the diagram that is captured by a user and that is used as a marker.

Furthermore, the specifying unit 136 may also specify the two circles as the markers on the basis of the parameter calculated by the calculating unit 135 described above. Specifically, if the proportion of the radius of the reference circle, in which the ratio of the diameter of the reference circle is set to a predetermined reference, to the radius of the variation circle has been registered by the registration unit 133, the specifying unit 136 performs the specifying process on the markers by using the subject value as the parameter to be calculated. Furthermore, if the cross ratio of the centers or the radii between the reference circle and the variation circle has been registered by the registration unit 133, the specifying unit 136 performs the specifying process on the markers by using the subject value as the parameter to be calculated. In this way, the specifying unit 136 specifies the markers on the basis of the parameter that takes an invariable value irrespective the state of capturing the image specified as the marker. Consequently, the specifying unit 136 can perform the specifying process with high stability regardless of the state of the image data.

About the Shaping Unit 137

The shaping unit 137 shapes the image data that includes the marker specified by the specifying unit 136 on the basis of the shaping information that is set in the subject marker. Specifically, the shaping unit 137 refers to the shaping information storage unit 122 and reads the shaping information that is previously set for the marker that is included in the image data. Then, the shaping unit 137 shapes, in accordance with the read shaping information, the image data that has been accepted from a user.

For example, the shaping unit 137 shapes the image data such that a new object is superimposed on the marker. Specifically, as illustrated in FIG. 4, the shaping unit 137 creates a predetermined arrow with respect to the marker or creates shaping image data in which text data or the like is superimposed.

About the Sending Unit 138

The sending unit 138 sends the image data shaped by the shaping unit 137 to the transmission source of the image data that has been accepted by the accepting unit 134. Specifically, the sending unit 138 according to the embodiment sends, to the transmission source (the user terminal 10) of the image data accepted by the accepting unit 134, the image data obtained by having shaped the image data sent from the subject transmission source. Furthermore, regarding the sending process, the sending unit 138 may also send the image data via, for example, a web site or the like that provides the image processing service.

3. Flow of the Image Processing

Figure 10:
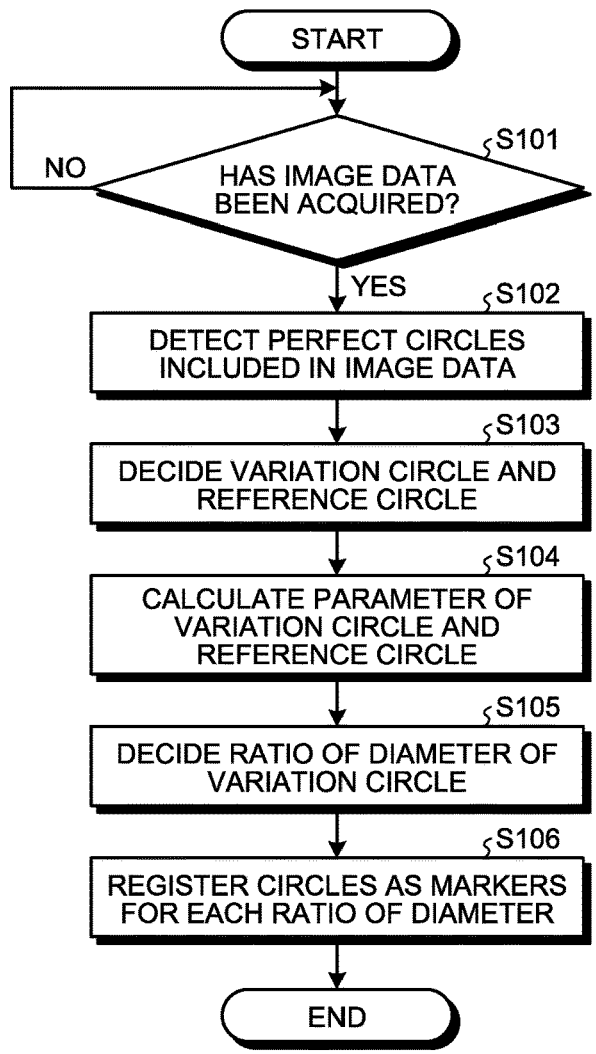
FIG. 10 is a flowchart (1) illustrating the flow of image processing according to the embodiment.

In the following, the flow of the image processing performed by the image processing device 100 according to the embodiment will be described with reference to FIGS. 10 and 11. FIG. 10 is a flowchart (1) illustrating the flow of image processing according to the embodiment. In FIG. 10, the flow related to the registration process in the flow of the image processing according to the embodiment will be described.

As illustrated in FIG. 10, the acquiring unit 131 according to the image processing device 100 determines whether the acquiring unit 131 has acquired the image data that includes therein markers to be registered (Step S101). If the acquiring unit 131 has not acquired the image data (No at Step S101), the acquiring unit 131 waits until the acquiring unit 131 acquires the image data.

In contrast, if the acquiring unit 131 has acquired the image data (Yes at Step S101), the detecting unit 132 detects the perfect circles included in the acquired image data (Step S102). Then, the registration unit 133 decides, from among the detected perfect circles, two circles that serve as the reference circle and the variation circle (Step S103). For example, the registration unit 133 submits the detected perfect circles to the user and decides the reference circle and the variation circle by accepting the assignment from the user.

Subsequently, the registration unit 133 calculates the parameter of the variation circle and the reference circle (Step S104). Specifically, the registration unit 133 calculates the parameter that indicates the positional relationship between the variation circle and the reference circle.

Furthermore, the registration unit 133 decides the ratio of the diameter of the variation circle with respect to the predetermined reference (Step S105). For example, the registration unit 133 decides to use "1", "1.05", and "1.1" as the ratio of the diameters.

Then, the registration unit 133 registers the circles as different markers for each of the decided ratios of the diameters in the marker information storage unit 121 (Step S106).

In the following, the flow related to the specifying process in the image processing according to the embodiment will be described with reference to FIG. 11. FIG. 11 10 is a flowchart (2) illustrating the flow of image processing according to the embodiment.

Figure 11:
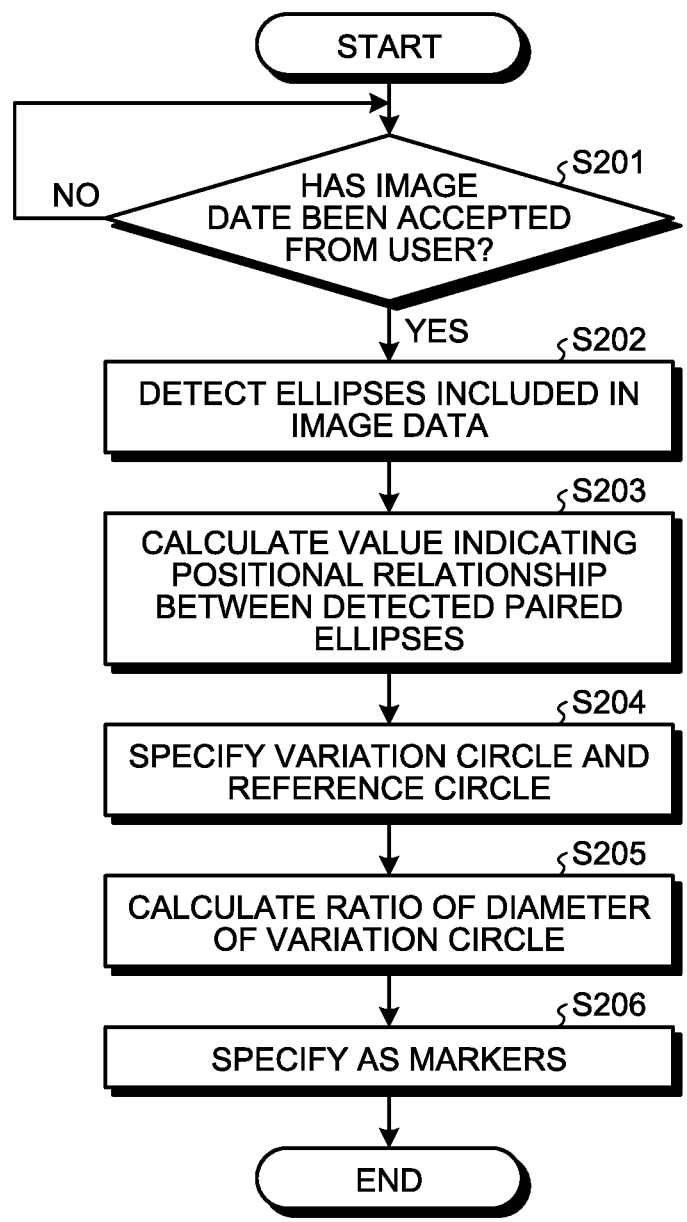
FIG. 11 is a flowchart (2) illustrating the flow of image processing according to the embodiment.

As illustrated in FIG. 11, the accepting unit 134 according to the image processing device 100 determines whether the submission of the image data has been accepted from the user terminal 10 (Step S201). If the accepting unit 134 has not accepted the submission of the image data (No at Step S201), the accepting unit 134 waits until the accepting unit 134 accepts the submission of the image data.

In contrast, if the accepting unit 134 has accepted the submission of the image data (Yes at Step S201), the calculating unit 135 detects the ellipses included in the image data (Step S202).

Then, the calculating unit 135 calculates the value indicating the positional relationship between the detected paired ellipses (Step S203). For example, the calculating unit 135 calculates each of the traces regarding the predetermined paired ellipses.

Then, the specifying unit 136 specifies that the ellipses included in the image data are the variation circle and the reference circle that are registered as the markers (Step S204). Specifically, the specifying unit 136 determines whether the trace calculated by the calculating unit 135 and the traces of the registered reference circle and the variation circle are within a predetermined threshold. If the traces are within a predetermined threshold, the specifying unit 136 specifies that the pair of the ellipses associated with the traces calculated by the calculating unit 135 are the variation circle and the reference circle.

Furthermore, the calculating unit 135 calculates the ratio of the diameter of the variation circle (Step S205). Then, the specifying unit 136 uniquely specifies, as the markers on the basis of the ratio of the diameter of the variation circle, the predetermined two circles included in the accepted image data (Step S206).

4. Modification

The image processing device 100 according to the embodiment described above may also be performed with various kinds of embodiments other than the embodiment described above. Therefore, another embodiment of the image processing device 100 will be described below.

4-1. Combination of Circles

In the embodiment described above, an example has been described in which a combination of two circles are set to a pair and markers are registered. At this point, regarding the combination to be paired, the image processing device 100 may also register among three different circles.

For example, an example has been described in which, in FIG. 1, the image processing device 100 registers the circle M01 as the variation circle M011 and registers the circle M02 as the reference circle M021. At this point, the image processing device 100 may also set the circle M01 as the variation circle M011 and sets, in addition to the circle M02, the circle M03 as the reference circle. At this point, the image processing device 100 registers the parameter that indicates the positional relationship between the circle M01 and the circle M02 and registers, in addition to the ratio of the diameter, the parameter that indicates the positional relationship between the circle M01 and the circle M03 or the ratio of the diameters.

Then, it is assumed that, after having registered the markers, the image processing device 100 accepts the image data that includes therein the image data P01 from a user. At this point, in the image data accepted from the user, the circle M02 included in the image data P01 may possibly be shadowed by a certain substance and consequently be hidden. It is assumed that the image data accepted from a user is, for example, the image data P10 illustrated in FIG. 3; however, there may sometimes be a case in which, in such image data, not all of the circles included in the image data P01 in the image data P10 are captured. For example, there may sometimes be a case in which, although the circle M01 and the circle M03 have been captured, the circle M02 is not captured (i.e., the image processing device 100 is not able to recognize the circle M02 from the image data).

In such a case, even if the image processing device 100 is not able to calculate the positional relationship between the circle M01 and the circle M02, the image processing device 100 can specify both the circle M01 and the circle M03 as the markers by calculating the positional relationship between the circle M01 and the circle M03. In this way, instead of registering only the relationship between the two circles, by choosing any two circles of three or more circles and registering the two circles as a pair, the image processing device 100 can improve the accuracy of detecting the two circles as the markers even from the image data captured in an inferior state. Consequently, the image processing device 100 can perform the specifying process with high stability.

Furthermore, in addition to use three circles for the processes, the image processing device 100 may also perform the processes described above by using two circles and a predetermined position in the vicinity of the two circles. For example, in the registration process, the image processing device 100 registers, in addition to the two circles, the parameter of the halfway point of the two circles. For example, the image processing device 100 registers the feature value of the pixel of the halfway point of the two circles. In this case, the image processing device 100 may also register color information itself on the halfway point or may also register comparison information between the predetermined pixels included in the two circles and the color information on the pixels of the subject halfway point. Then, in the specifying process, if a plurality of candidates for the pair of the two circles to be specified as the markers is specified, the image processing device 100 determines an image feature value of the halfway point of the pair. Then, the image processing device 100 specifies, on the basis of the registered image feature value, the pair of the two circles having the approximate halfway point as the markers. Consequently, the image processing device 100 can improve the accuracy at the time when the two circles are specified as the markers. Furthermore, as the predetermined position in the vicinity of the two circles, instead of always using the halfway point of the two circles, the image processing device 100 may also register an arbitrary point as a third element for specifying a marker. Furthermore, as the feature value of a point, instead of always using the feature value of a pixel, the image processing device 100 may also register, for example, as the parameter, information coordinate relationship (for example, information on a vector from the center of a circle to the halfway point) between the centers of the circles, or the like.

In this way, the image processing device 100 registers, including the feature value of an arbitrary point (for example, a halfway point obtained when the center of the reference circle and the center of the variation circle are connected, etc.) having the predetermined positional relationship between the reference circle and the variation circle in the predetermined image data used for the registration, the subject reference circle and the variation circle as the markers. Then, by checking the predetermined parameter that is calculated from the two circles included in the image data accepted by the accepting unit 134 and the feature value at an arbitrary point (for example, the halfway point obtained when the centers of the two circles specified in the accepted image data are connected, etc.) having the predetermined positional relationship between the two circles against the parameters associated with the markers that are previously registered, the image processing device 100 specifies, as the markers, the two circles included in the accepted image data. With this process, in addition to the parameter of the two circles, the image processing device 100 can increase the element to be specified, whereby the image processing device 100 can perform the specifying process with high stability.

4-2. Process Performed by a Terminal

In the embodiment described above, an example has been described in which the image processing device 100 accepts the image data from the user terminal 10 and performs a process of specifying the markers. At this point, the device associated with the image processing device according to the embodiment may also be the user terminal 10 instead of the image processing device 100.

Namely, the user terminal 10 has the same configuration as that of the image processing device 100 illustrated in, for example, FIG. 5 and performs the process of specifying the markers from the image data. Specifically, if the user terminal 10 captures the image that includes therein the markers and acquires the image data, the user terminal 10 performs, on the subject image data, the process of specifying the markers. Then, the user terminal 10 performs a predetermined shaping process on the captured image data. Consequently, the user terminal 10 can acquire the image data that includes therein the service information or the like that is previously set in the markers.

In this case, regarding the registration information itself on the markers, the user terminal 10 may also use the data registered in the image processing device 100. Furthermore, the user terminal 10 may also hold the shaping information by the user terminal 10 by itself or may acquire only the shaping information that is used for the process by accessing the image processing device 100. In this way, the processes according to the embodiment do not always need to be performed by the image processing device 100 that is the server device and may also be performed by the user terminal 10.

4-3. Use of Markers

In the embodiment described above, an example has been described in which the image processing device 100 performs the process of specifying the markers in the image data and shaping the information to the image data. These processes are not always used to create a shaping image and may also be used to simply specify the markers in the image data. Namely, the image processing device 100 may also use the methods described above not only for specifying the markers for creating the shaped image data but also for simply specifying visual markers in a single piece of image data.

4-4. Specifying Markers

In the embodiment described above, an example has been described in which the image processing device 100 performs the process of registering two perfect circles in the image data including patterns as the markers and specifying the markers from the image data that is sent from a user and that includes therein the patterns. At this point, the patterns do not always need to be included in the image data handled by the image processing device 100. As described above, the image processing device 100 performs the process of specifying the markers by using the positional relationship of the two circles and the ratio of the diameter of the variation circle as the parameter. Consequently, the image processing device 100 can perform the process of specifying the markers without depending on the patterns.

4-5. Variation of Images to be Processed

In the embodiment described above, an example has been described in which the image processing device 100 specifies the markers from the image data accepted from a user. At this point, the data accepted from the user is not limited to a still image but may also be a moving image. In this case, the image processing device 100 detects the circles from consecutive image data and specifies which of the circles are registered as the markers. Furthermore, in this process, the image processing device 100 may also appropriately use, for example, the known method, such as structure from motion, or the like. With this method, because the image processing device 100 can restore the three-dimensional shape of the image on the basis of a plurality of pieces of image data captured from various points of view, the image processing device 100 can detect the association point (in the example described in the embodiment, the feature point of the diagram that is detected as a circle) that is associated between the plurality of pieces of image data.

More specifically, the image processing device 100 refers to the frames (images constituting the moving image) before and after the subject frame in the moving image and detects the two circles as the markers. In this case, even in a case in which the image processing device 100 is not able to clearly detect the two circles by only using the predetermined frames, the image processing device 100 may also detect the markers of the two circles in the predetermined frames on the basis of the position information on the two circles acquired from before and after the subject frame. Namely, if the image processing device 100 performs a process on a plurality of images, such as moving images, or the like, that continue in time series, the image processing device 100 may also detect the markers of the image that is the processing target on the basis of the parameter of the two circles in the images that are before and after the image targeted for the processing and that continues in time series. Namely, even if the image processing device 100 is not able to detect one of the two circles in a predetermined image, the image processing device 100 can complement the detecting process by using the images before and after the subject image in terms of time.

In this way, the image processing device 100 accepts a plurality of pieces of image data (for example, a moving image) that includes therein at least a single piece of image data that includes therein at least two diagrams that can be extracted as circles. Then, in the predetermined image data out of the plurality of pieces of accepted image data, on the basis of the result of checking the parameter that is calculated from the pair of the two circles that are included in one of the pieces of the image data that is different from the predetermined image data from among the plurality of pieces of the image data against the parameter that is calculated from the pair of the two perfect circles that have previously been registered as markers that are used for image processing, the image processing device 100 specifies, as the markers, the pair of the two circles that are estimated to be included in the subject predetermined image data. In other words, even if the image processing device 100 is not able to clearly specify the two circles from the image data that is targeted for the processing (for example, a part of the circle is blocked at the capturing and is not included in the image data due to any cause), because the image processing device 100 can specify a change in the position information on the two circles specified in the image data before and after the subject image data, the image processing device 100 can estimate the two circles in the image data targeted for the processing. Consequently, the image processing device 100 can perform a robust specifying process.

5. Others

Of the processes described in the embodiment, the all or a part of the processes that are mentioned as being automatically performed can also be manually performed, or the all or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the calculating unit 135 and the specifying unit 136 illustrated in FIG. 5 may also be integrated. Furthermore, the image processing device 100 may also be separated into a front end server that mainly sends and receives data to and from a user and a back end server that performs a creating process or the like. In this case, the front end server includes at least the acquiring unit 131, the accepting unit 134, and the sending unit 138. Furthermore, the back end server includes at least the specifying unit 136. Furthermore, the image processing device 100 may also use an external storage server instead of including the storage unit 120 inside the image processing device 100.

Furthermore, each of the embodiments described above can be appropriately used in combination as long as the processes do not conflict with each other.

6. Hardware Configuration

Figure 12:
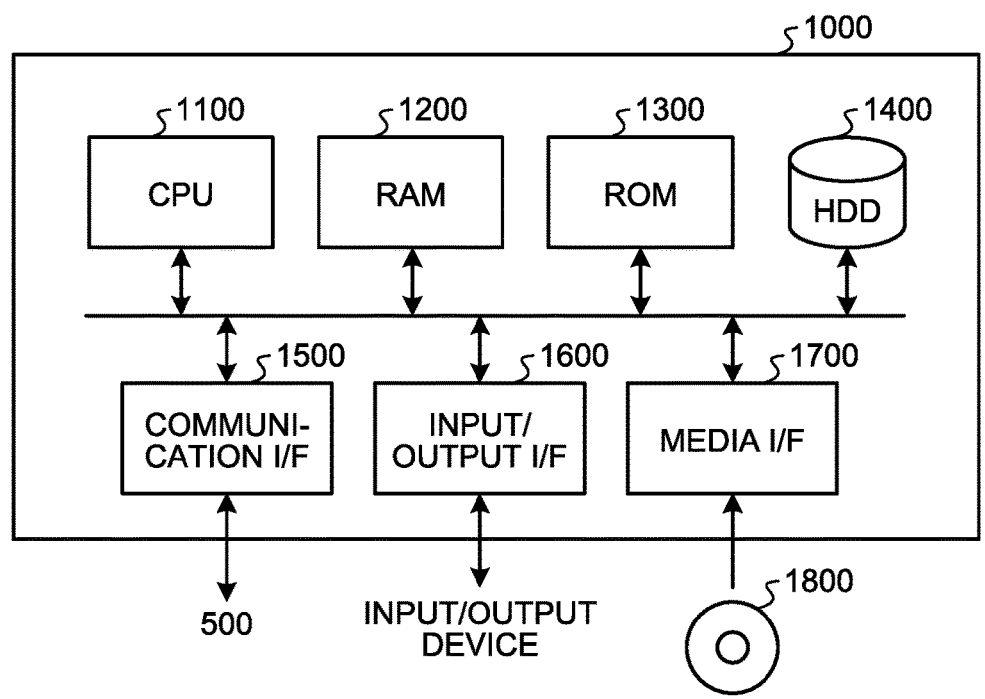
FIG. 12 is a hardware configuration diagram illustrating an example of a computer that implements the function of the image processing device.

Furthermore, the image processing device 100 and the user terminal 10 according to the embodiment described above are implemented by, for example, a computer 1000 illustrated in FIG. 12. In the following, a description will be given by using the image processing device 100 as an example. FIG. 12 is a hardware configuration diagram illustrating an example of the computer 1000 that implements the function of the image processing device 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 is operated on the basis of the programs stored in the ROM 1300 or the HDD 1400 and performs control of each unit. The ROM 1300 stores therein a boot program that is executed by the CPU 1100 at the time of a startup of the computer 1000, a program that depends on the hardware of the computer 1000, or the like.

The HDD 1400 stores therein the programs executed by the CPU 1100, data used by the subject programs, and the like. The communication interface 1500 receives data from another device via a communication network 500 (corresponds to the network N described in the embodiment), sends the received data to the CPU 1100, and also sends the data created by the CPU 1100 to another device via the communication network 500.

The CPU 1100 controls, via the input/output interface 1600, an output device, such as a display, a printer, or the like, and controls an input device, such as a keyboard, a mouse, or the like. The CPU 1100 acquires data from the input device via the input/output interface 1600. Furthermore, the CPU 1100 outputs the data created via the input/output interface 1600 to the output device.

The media interface 1700 reads the program or data stored in a recording medium 1800 and provides the read program or data to the CPU 1100 via the RAM 1200. The CPU 1100 loads, via the media interface 1700, the subject program from the recording medium 1800 into the RAM 1200 and executes the loaded program. The recording medium 1800 is, for example, an optical recording medium, such as a digital versatile disc (DVD), a phase change rewritable disk (PD), or the like, a magneto optical recording medium, such as a magneto-optical disk (MO), or the like, a tape medium, a magnetic recording medium, a semiconductor memory, or the like.

For example, when the computer 1000 functions as the image processing device 100, the CPU 1100 in the computer 1000 implements the function of the control unit 130 by executing the program loaded into the RAM 1200. Furthermore, the HDD 1400 stores therein data in the storage unit 120. The CPU 1100 in the computer 1000 reads the programs from the recording medium 1800; however, as another example, the programs may also be acquired from another device via the communication network 500.

7. Effects

As described above, the image processing device 100 according to the embodiment includes the accepting unit 134 and the specifying unit 136. The accepting unit 134 accepts image data that includes therein at least two diagrams that can be extracted as circles. The specifying unit 136 checks a parameter that is calculated from a pair of two circles that are included in the image data accepted by the accepting unit 134 against a parameter that is calculated from a pair of the two perfect circles that have previously been registered as markers that are used for image processing, whereby the specifying unit 136 specifies the pair of the two circles included in the subject image data as the markers.

In this way, the image processing device 100 according to the embodiment can specify the two circles included in the image as the markers that are used for predetermined image processing. Consequently, the image processing device 100 can perform the image processing, such as the AR process, or the like, without including a special marker, such as the QR code, in the image data. Namely, the image processing device 100 can use the image data that includes therein marker without causing any discomfort for a user in the image processing.

Furthermore, by using, as the parameters, both a value that indicates the positional relationship between the two circles and the ratio of the diameter of one of the two circles with respect to a predetermined reference, the specifying unit 136 specifies, as the markers, the two circles included in the image data.

In this way, the image processing device 100 according to the embodiment specifies the markers on the basis of the positional relationship and the ratio of the diameters. Consequently, the image processing device 100 can specify the markers with high accuracy.

Furthermore, the image processing device 100 according to the embodiment further includes the registration unit 133 that registers, regarding predetermined image data that includes therein at least two perfect circles, at least one of the perfect circles as a variation circle that is a circle in which the ratio of the diameter with respect to the predetermined reference is calculated, a circle that is other than the variation circle and that serves as a reference for calculating both the ratio of the diameter of the variation circle and a value that indicates the positional relationship between the two perfect circles as a reference circle, and a set of the pair of the variation circle and the reference circle as the markers. Furthermore, by checking a predetermined parameter calculated from the two circles included in the image data against the parameters associated with the markers registered by the registration unit 133, the specifying unit 136 specifies, as the markers, the two circles included in the subject image data.

In this way, the image processing device 100 according to the embodiment specifies the markers on the basis of the previously registered data. Consequently, because the image processing device 100 can register the perfect circles included in the predetermined image data desired by, for example, a user as the markers, the image processing device 100 can implement the image processing convenient for the user.

Furthermore, the registration unit 133 registers, as each of different markers, each of the pairs of the variation circles and the reference circles having a different numeric value of the ratio of the diameter with respect to the predetermined reference. The specifying unit 136 specifies, on the basis of the value of the ratio of the diameter of the variation circle with respect to the predetermined reference out of the predetermined parameters calculated from the two circles included in the image data, which of the markers corresponds to the markers registered by the registration unit 133.

In this way, the image processing device 100 according to the embodiment can register, for each ratio of the diameter, as each of the markers as different markers. Consequently, even in a case in which information that is different for each of the markers is desired to be provided, the image processing device 100 can respond by only changing the ratio of the diameter without preparing a plurality of patterns or the like as the markers. In this way, the image processing device 100 can implement convenient image processing.

Furthermore, as the value indicating the positional relationship between the variation circle and the reference circle, the registration unit 133 registers traces of the subject variation circle and the reference circle. If the traces calculated from the two circles included in the image data accepted by the accepting unit 134 and the traces of the variation circle and the reference circle registered by the registration unit 133 are within a predetermined threshold, the specifying unit 136 specifies, as the markers, the two circles included in the image data.

In this way, the image processing device 100 according to the embodiment calculates the traces of the circles on the basis of the coordinates on the image data and specifies the markers. Consequently, the image processing device 100 can specify the markers with high accuracy.

Furthermore, the registration unit 133 registers, together with a feature value of an arbitrary point having the predetermined positional relationship between the reference circle and the variation circle in the predetermined image data, the reference circle and the variation circle as the markers. The specifying unit 136 specifies, as the markers, by checking the predetermined parameter calculated from the two circles included in the image data accepted by the accepting unit 134 and the feature value at an arbitrary point having the predetermined positional relationship between the two circles against the parameters associated with the markers registered by the registration unit 133, the two circles included in the image data.

In this way, the image processing device 100 according to the embodiment adds, in addition to the two circles, an element that is used to specify the feature value, such as a halfway point, of the two circles, whereby the image processing device 100 can perform the specifying process with high stability.

Furthermore, the specifying unit 136 performs projective transformation on the image data such that the circular diagram included in the image data accepted by the accepting unit 134 becomes the perfect circle and specifies, on the basis of the parameter held by the predetermined pair of the perfect circles that have been subjected to the projective transformation, the markers included in the subject image data.

In this way, by performing projective transformation, the image processing device 100 according to the embodiment can accurately specify the markers irrespective of, for example, the angle of the diagram to be specified as a marker captured by a user.

Furthermore, on the basis of the ratio of the radii of the two perfect circles at the time when the circular diagrams included in the image data are transformed to the perfect circles by the projective transformation, the specifying unit 136 specifies the markers included in the subject image data.

In this way, even if the image processing device 100 according to the embodiment has performed the projective transformation, the image processing device 100 specifies the markers by using the invariable parameter. Consequently, the image processing device 100 can specify the markers irrespective of the angle of the diagram to be specified as the marker captured by a user.

Furthermore, the specifying unit 136 specifies, regarding the two circles included in the image data, on the basis of the cross ratio that is the value indicating a ratio of ratios of the length from the point of intersection of the straight line passing through the centers of the two circles and each of the circles to one of the centers of the two circles, the markers included in the subject image data.

In this way, the image processing device 100 according to the embodiment specifies the markers on the basis of the cross ratio of the two circles. With this process, because the image processing device 100 does not always need to perform the projective transformation, the image processing device 100 can reduce the processing load in the image processing.

Furthermore, the image processing device 100 according to the embodiment further includes the shaping unit 137 that shapes, on the basis of shaping information that is set in the subject marker, the image data that includes therein the markers specified by the specifying unit 136 and the sending unit 138 that sends the image data shaped by the shaping unit 137 to the transmission source of the image data that has been accepted by the accepting unit 134.

In this way, the image processing device 100 according to the embodiment shapes the specified markers by performing, for example, the AR process and sends back the shaped image data to the user. Consequently, the image processing device 100 can perform a process, such as a process of providing information using the markers, that is convenient for a user and thus improve the degree of satisfaction of the user.

Furthermore, the accepting unit 134 accepts a plurality of pieces of mage data that includes therein at least a single piece of image data that includes therein at least two diagrams that can be extracted as circles. In the predetermined image data out of the plurality of pieces of the image data accepted by the accepting unit 134, the specifying unit 136 specifies, as the markers on the basis of the result of checking the parameter that is calculated from the pair of the two circles that are included in one of the pieces of the image data that is different from the predetermined image data from among the plurality of pieces of the image data against the parameter that is calculated from the pair of the two perfect circles that have previously been registered as markers that are used for image processing, the pair of the two circles that are estimated to be included in the predetermined image data.

In this way, the image processing device 100 according to the embodiment can specify, in the consecutive image data, such as a moving image, or the like, the markers in the image data targeted for the processing on the basis of the markers specified by, for example, image data before and after the subject image data. Consequently, the image processing device 100 can perform a more robust specifying process.

Furthermore, the configuration of the image processing device 100 described above can be flexibly changed, such as implementing by a plurality of server computers or implementing by, depending on a function, calling an external platform or the like by an application programming interface (API), a network computing, or the like.

Furthermore, "means" described in claims can be read as a "component (section, module, unit)" or a "circuit". For example, the specifying means can be read as a specifying unit or a specifying circuit.

According to an aspect of an embodiment of the image processing device, an advantage is provided in that it is possible to use, in image processing without causing any discomfort, image data in which markers are included.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
   an accepting unit that accepts image data that includes therein at least two diagrams that can be extracted as circles; and
   a specifying unit that specifies, by checking a parameter that is calculated from a pair of two circles included in the image data accepted by the accepting unit against a parameter that is calculated from a pair of two perfect circles that have previously been registered as markers that are used for image processing, the pair of the two circles included in the image data as the markers.

2. The image processing device according to claim 1, wherein
   by using, as the parameters, both a value that indicates the positional relationship between the two circles and the ratio of the diameter of one of the two circles with respect to a predetermined reference, the specifying unit specifies, as the markers, the two circles included in the image data.

3. The image processing device according to claim 1, further comprising:
   a registration unit that registers, regarding predetermined image data that includes therein at least two perfect circles, at least one of the perfect circles as a variation circle that is a circle in which the ratio of the diameter with respect to the predetermined reference is calculated, a circle that is other than the variation circle and that serves as a reference for calculating both the ratio of the diameter of the variation circle and a value that indicates the positional relationship between the two perfect circles as a reference circle, and a set of the pair of the variation circle and the reference circle as the markers, wherein
   the specifying unit specifies, as the markers by checking a predetermined parameter calculated from the two circles included in the image data against the parameters associated with the markers registered by the registration unit, the two circles included in the image data.

4. The image processing device according to claim 3, wherein
   the registration unit registers, as each of different markers, each of the pairs of variation circles and the reference circles having a different numeric value of the ratio of the diameter with respect to the predetermined reference, and
   the specifying unit specifies, on the basis of a numeric value of the ratio of the diameter of the variation circle with respect to the predetermined reference out of the predetermined parameters calculated from the two circles included in the image data, which of the markers corresponds to the markers registered by the registration unit.

5. The image processing device according to claim 3, wherein
   the registration unit registers, as the value indicating the positional relationship between the variation circle and the reference circle, traces of the variation circle and the reference circle, and
   the specifying unit specifies, as the markers when the traces calculated from the two circles included in the image data accepted by the accepting unit and the traces of the variation circle and the reference circle registered by the registration unit are within a predetermined threshold, the two circles included in the image data.

6. The image processing device according to claim 3, wherein
   the registration unit registers, together with a feature value of an arbitrary point having the predetermined positional relationship between the reference circle and the variation circle in the predetermined image data, the reference circle and the variation circle as the markers, and the specifying unit specifies, as the markers by checking the predetermined parameter calculated from the two circles included in the image data accepted by the accepting unit and the feature value at an arbitrary point having the predetermined positional relationship between the two circles against the parameters associated with the markers registered by the registration unit, the two circles included in the image data.

7. The image processing device according to claim 1, wherein
the specifying unit performs projective transformation on the image data such that the circular diagram included in the image data accepted by the accepting unit becomes the perfect circle and specifies, on the basis of the parameter held by the predetermined pair of the perfect circles that have been subjected to the projective transformation, the markers included in the image data.

8. The image processing device according to claim 7, wherein
the specifying unit specifies, on the basis of the ratio of the radii of the two perfect circles at the time when the circular diagrams included in the image data are transformed to the perfect circles by the projective transformation, the markers included in the image data.

9. The image processing device according to claim 1, wherein
the specifying unit specifies, regarding the two circles included in the image data, on the basis of the cross ratio that is the value indicating a ratio of ratios of the length from a point of intersection of the straight line passing through the centers of the two circles and each of the circles to one of the centers of the two circles, the markers included in the image data.

10. The image processing device according to claim 1, further comprising:
a shaping unit that shapes, on the basis of shaping information that is set in the markers, the image data that includes therein the markers specified by the specifying unit; and
a sending unit that sends the image data shaped by the shaping unit to the transmission source of the image data accepted by the accepting unit.

11. The image processing device according to claim 1, wherein
the accepting unit accepts a plurality of pieces of image data that includes therein at least a single piece of image data that includes therein at least two diagrams that can be extracted as circles, and
in the predetermined image data out of the plurality of pieces of the image data accepted by the accepting unit, the specifying unit specifies, as the markers on the basis of the result of checking the parameter that is calculated from the pair of the two circles that are included in one of the pieces of the image data that is different from the predetermined image data from among the plurality of pieces of the image data against the parameter that is calculated from the pair of the two perfect circles that have previously been registered as markers that are used for image processing, the pair of the two circles that are estimated to be included in the predetermined image data.

12. An image processing method performed by a computer, the image processing method comprising:
accepting image data that includes therein at least two diagrams that can be extracted as circles; and
specifying, by checking a parameter that is calculated from a pair of two circles included in the image data accepted at the accepting against a parameter that is calculated from a pair of two perfect circles that have previously been registered as markers that are used for image processing, the pair of the two circles included in the image data as the markers.

13. A non-transitory computer readable recording medium having stored therein an image processing program that causes a computer to execute a process comprising:
accepting image data that includes therein at least two diagrams that can be extracted as circles; and
specifying, by checking a parameter that is calculated from a pair of two circles included in the image data accepted at the accepting against a parameter that is calculated from a pair of two perfect circles that have previously been registered as markers that are used for image processing, the pair of the two circles included in the image data as the markers.

\* \* \* \* \*